(12) United States Patent
Ishida et al.

(10) Patent No.: US 7,487,853 B2
(45) Date of Patent: Feb. 10, 2009

(54) SADDLE-TYPE VEHICLE

(75) Inventors: Yousuke Ishida, Shizuoka (JP); Akifumi Oishi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 249 days.

(21) Appl. No.: 11/461,324

(22) Filed: Jul. 31, 2006

(65) Prior Publication Data
US 2007/0023217 A1 Feb. 1, 2007

(30) Foreign Application Priority Data
Aug. 1, 2005 (JP) ............... 2005-222918
Jun. 30, 2006 (JP) ............... 2006-182593

(51) Int. Cl.
*B62D 61/02* (2006.01)
(52) U.S. Cl. ............... 180/219; 180/68.1; 180/230
(58) Field of Classification Search ........... 180/219, 180/68.1, 230
See application file for complete search history.

(56) References Cited

U.S. PATENT DOCUMENTS

| | | | |
|---|---|---|---|
| 4,344,500 A * | 8/1982 | Kurata et al. ............. | 180/230 |
| 4,498,553 A * | 2/1985 | Kurata et al. ............. | 180/230 |
| 4,712,629 A * | 12/1987 | Takahashi et al. ........ | 180/68.1 |
| 6,920,949 B2 * | 7/2005 | Matsuura et al. .......... | 180/68.2 |
| 7,201,686 B2 * | 4/2007 | Masuda et al. ............ | 474/144 |

FOREIGN PATENT DOCUMENTS

| | | | |
|---|---|---|---|
| JP | 2002-130440 | | 5/2002 |
| WO | WO 2005/007499 | * | 1/2005 |

* cited by examiner

*Primary Examiner*—Paul N Dickson
*Assistant Examiner*—Tashiana Adams
(74) *Attorney, Agent, or Firm*—Hogan & Hartson LLP

(57) ABSTRACT

A saddle-type vehicle with improved cooling performance of a V-belt continuously variable transmission and a compact body cover. A motorcycle has a downward-recessed space defined by a body cover in front of a seat. An engine unit is supported by a body frame below the recessed space. The engine unit has a transmission case with a belt chamber for accommodating a V-belt continuously variable transmission. An air chamber communicates with the belt chamber through an air intake duct. The air chamber is disposed above the front part of an arm of the rear arm relative to a middle thereof in a front-rear direction.

17 Claims, 18 Drawing Sheets

SADDLE-TYPE VEHICLE

RELATED APPLICATIONS

This application claims the benefit of priority under 35 USC 119 of Japanese patent application no. 2005-222918, filed on Aug. 1, 2005, and Japanese patent application no. 2006-182593, filed on Jun. 30, 2006, which applications are hereby incorporated by reference in their entirety.

BACKGROUND OF THE INVENTION

1. Field of the Invention

The present invention relates to a saddle-type vehicle including a V-belt continuously variable transmission.

2. Description of Related Art

Motorcycles including a V-belt continuously variable transmission are well known (for example, refer to JP-A-2002-130440).

The V-belt of the V-belt continuously variable transmission of motorcycles increases in temperature during driving due to frictional heat etc. Thus, a method of forcibly cooling the V-belt by supplying air into a belt chamber containing the V-belt from the exterior is often used.

The motorcycle disclosed in JP-A-2002-130440 includes a body frame having a substantially V-shape configuration, as viewed from the side. The body frame is covered with a body cover. An engine is disposed in the substantially V-shape valley of the body frame. The body frame has a front slope inclined from the valley to the upper front and a rear slope inclined from the valley to the upper rear.

The motorcycle includes an intake duct for taking air into the belt chamber and an exhaust duct for discharging the air in the belt chamber to the exterior. The intake duct is disposed on a substantially straight line along the front slope of the body frame toward a position in front of the head pipe. The exhaust duct is disposed on a substantially straight line along the rear slope of the body frame toward a position above the rear wheel. Thus, the intake duct and the exhaust duct of the motorcycles are disposed along the substantially V-shape of the body frame.

However, since the motorcycle disclosed in JP-A-2002-130440 is constructed such that the exhaust duct is disposed along the rear slope of the body frame in the body cover, the body cover is increased in size by an amount corresponding to the exhaust duct. On the other hand, if the exhaust duct is decreased in diameter to downsize the body cover, a sufficient cross-section area of the passage (exhaust passage) in the exhaust duct cannot be provided, resulting in a decrease in the cooling performance of the V-belt continuously variable transmission.

SUMMARY OF THE INVENTION

The present invention has been made in light of such circumstances, and it is an object of the invention to provide both improved cooling performance of a V-belt continuously variable transmission and downsizing of the body cover.

A saddle-type vehicle according to the invention includes: a frame; an engine unit supported by the frame, and including an engine; a V-belt continuously variable transmission; and a transmission case containing a belt chamber for accommodating the V-belt continuously variable transmission; a rear arm pivotally supported by the frame behind the transmission case; a rear wheel supported by the rear arm; and an air passage disposed above the front part of the rear arm relative to the middle thereof in the front-back direction, for communicating with the belt chamber.

Since the saddle-type vehicle has an air passage communicating with the belt chamber above the front part of the rear arm, the space above the front part of the rear arm can be effectively used as a space for the air passage. Thus, an air passage having a sufficient cross-sectional area can be provided without upsizing of the body cover. Therefore, both of an increase in cooling performance of the V-belt continuously variable transmission and downsizing of the body cover can be achieved.

According to the invention, in a saddle-type vehicle including a V-belt continuously variable transmissions, can be provided with both of an increase in cooling performance of the V-belt continuously variable transmission and downsizing of the body cover can be achieved.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 4 is a sectional view taken along line IV-IV of FIG. 1, showing the positional relationship among the main frame, the rear frame, the air chamber and so on.

DETAILED DESCRIPTION OF THE INVENTION

Embodiments of the present invention are described in detail below with reference to the drawings.

First Embodiment

Figure 1:
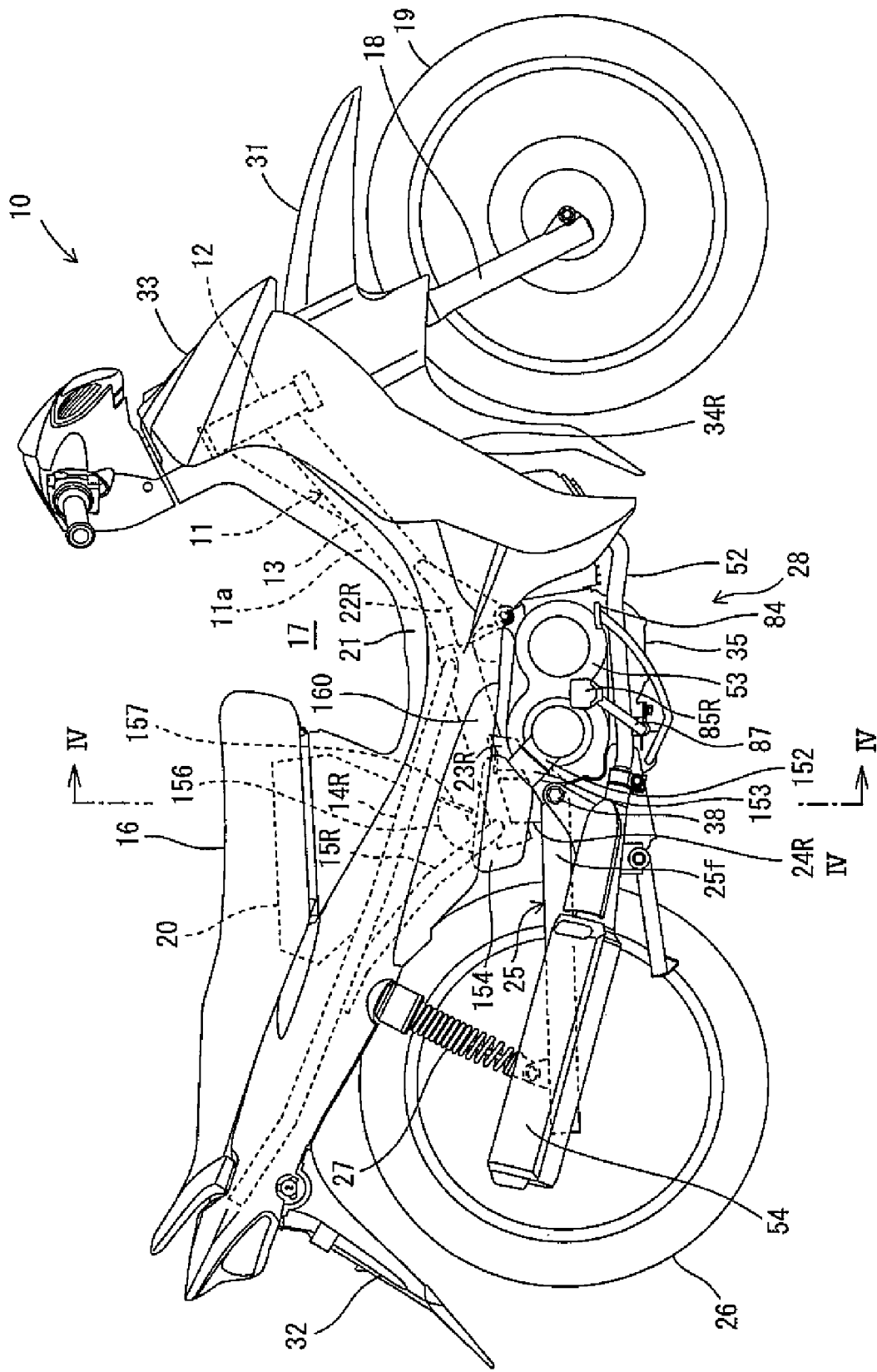
FIG. 1 is a side view of a motorcycle according to a first embodiment.

As shown in FIG. 1, a saddle-type vehicle according to a first embodiment of the invention is a motorcycle 10. The motorcycle 10 includes a body frame 11 and a seat 16 for an occupant to sit on. The motorcycle 10 is what is called a moped. That is, the motorcycle 10 has a side-viewed recessed space 17 that is recessed downward in front of the seat 16, in which an occupant seated in the seat 16 straddles the body frame 11. The term "moped" as used herein simply indicates the type of the vehicle in terms of shape, and does not limit the maximum speed, piston displacement, the size of the vehicle and so on.

The saddle-type vehicle according to the invention is not limited to a moped but may be another type of motorcycle in which a fuel tank is disposed in front of the seat.

In the following description, the terms front, rear, right, and left denote the directions viewed from the perspective of a rider seated in the seat 16. The body frame 11 includes: a steering head pipe 12; a main frame 13 extending from the steering head pipe 12 obliquely downward toward the rear; right and left seat rails 14R and 14L extending from the middle of the main frame 13 obliquely upward toward the rear; and right and left seat-pillar tubes 15R and 15L connected between the rear end of the main frame 13 and the middle of the seat rails 14R and 14L.

The upper part and right and left sides of the body frame 11 are covered with a body cover 21. The upper surface of the body cover 21 and the front of the seat 16 define the downward-recessed space 17. A center tunnel 11a serving as the path of the main frame 13 is provided below the body cover 21.

The steering head pipe 12 supports a front wheel 19 with a front fork 18. The seat rails 14R and 14L support a fuel tank 20 and the seat 16 thereon. The seat 16 extends from above the fuel tank 20 toward the rear ends of the seat rails 14R and 14L. The fuel tank 20 is disposed on the front half of the seat rails 14R and 14L, and is covered with the body cover 21 and the seat 16.

A pair of right and left first engine brackets 22R and 22L projecting downward is provided in the middle of the main frame 13. A pair of right and left second engine brackets 23R and 23L and right and left rear-arm brackets 24R and 24L are provided at the rear end of the main frame 13. The first engine brackets 22R and 22L, the second engine brackets 23R and 23L, and the rear-arm brackets 24R and 24L and the like, constitute part of the body frame 11.

Figure 3:
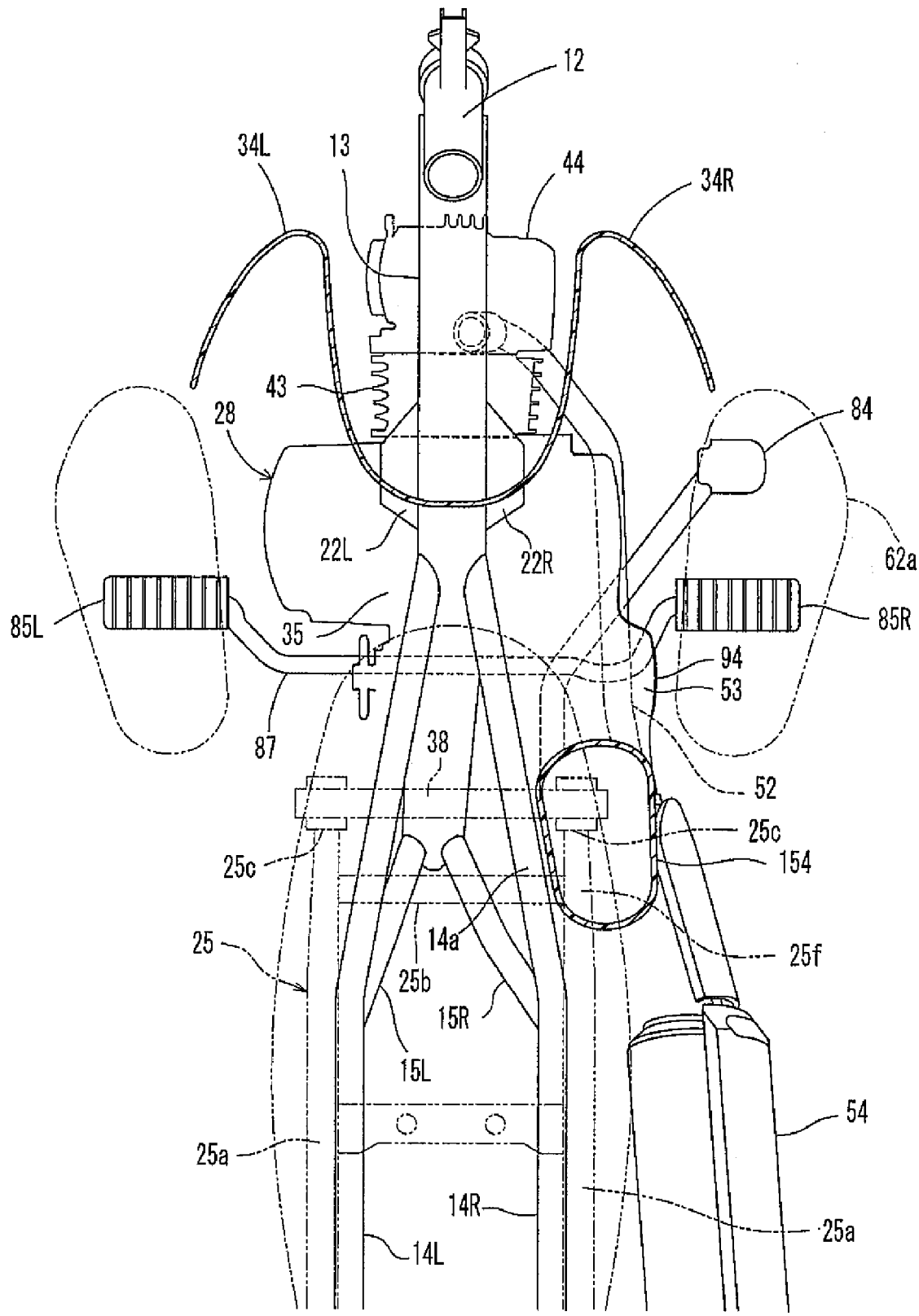
FIG. 3 is a plan view showing the positional relationship among a body frame, an engine unit, an air chamber and so on of the motorcycle according to the first embodiment of the invention.

Referring to FIG. 3, a rear arm 25 includes a pair of right and left arms 25a and a joint 25b that joins the two arms 25a together. Each arm 25a has a pivot 25c at the end, through which a pivot shaft 38 is passed through.

Figure 4:
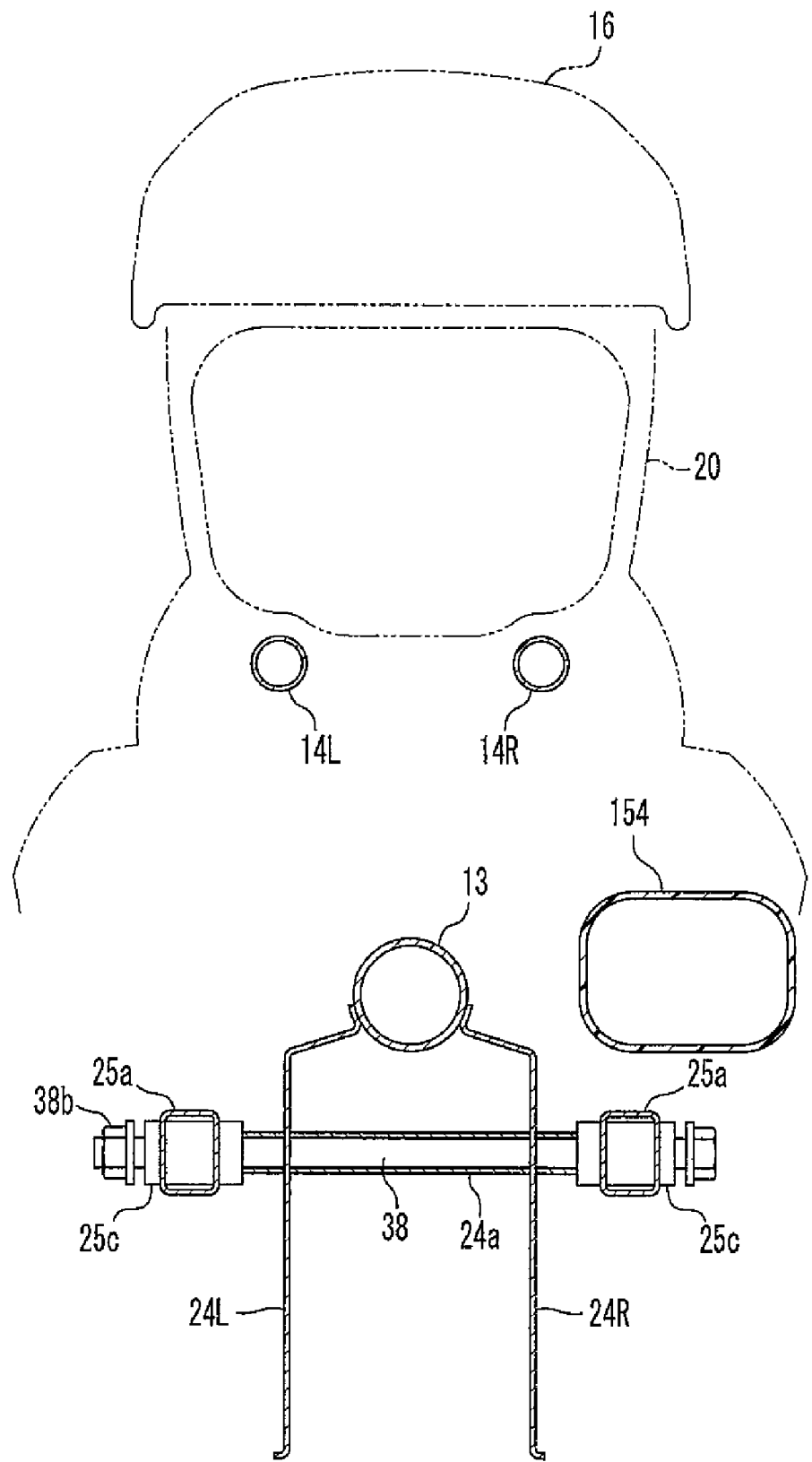

The rear-arm brackets 24R and 24L project downward from the rear end of the main frame 13. Referring to FIG. 4, the rear-arm brackets 24R and 24L have a pipe 24a. The pivot shaft 38 passes through the pipe 24a and the right and left pivots 25c. The pivot shaft 38 is a long bolt, the left end of which is secured with a nut 38b. Thus, the front end of the rear arm 25 is pivotally supported by the pivot shaft 38. The rear end of the rear arm 25 supports a rear wheel 26. The rear half of the rear arm 25 is suspended by the body frame 11 with a cushion unit 27.

Figure 7:
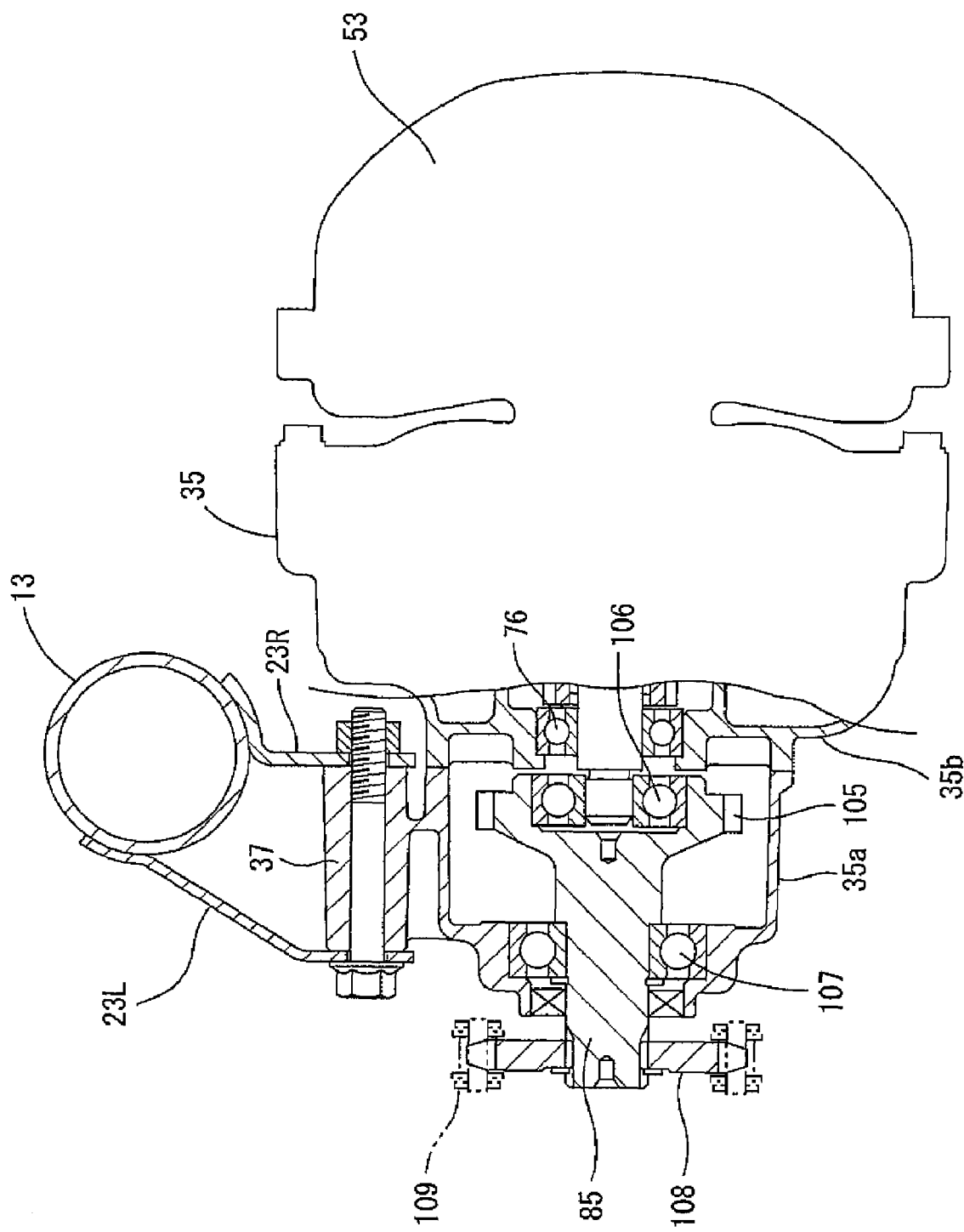
FIG. 7 is a sectional view showing the mounting state of the engine unit.

Referring to FIG. 7, the second engine brackets 23R and 23L project downward from the rear end of the main frame 13. The right and left second engine brackets 23R and 23L are opposed to each other with a space therebetween in the vehicle width direction.

Figure 6:
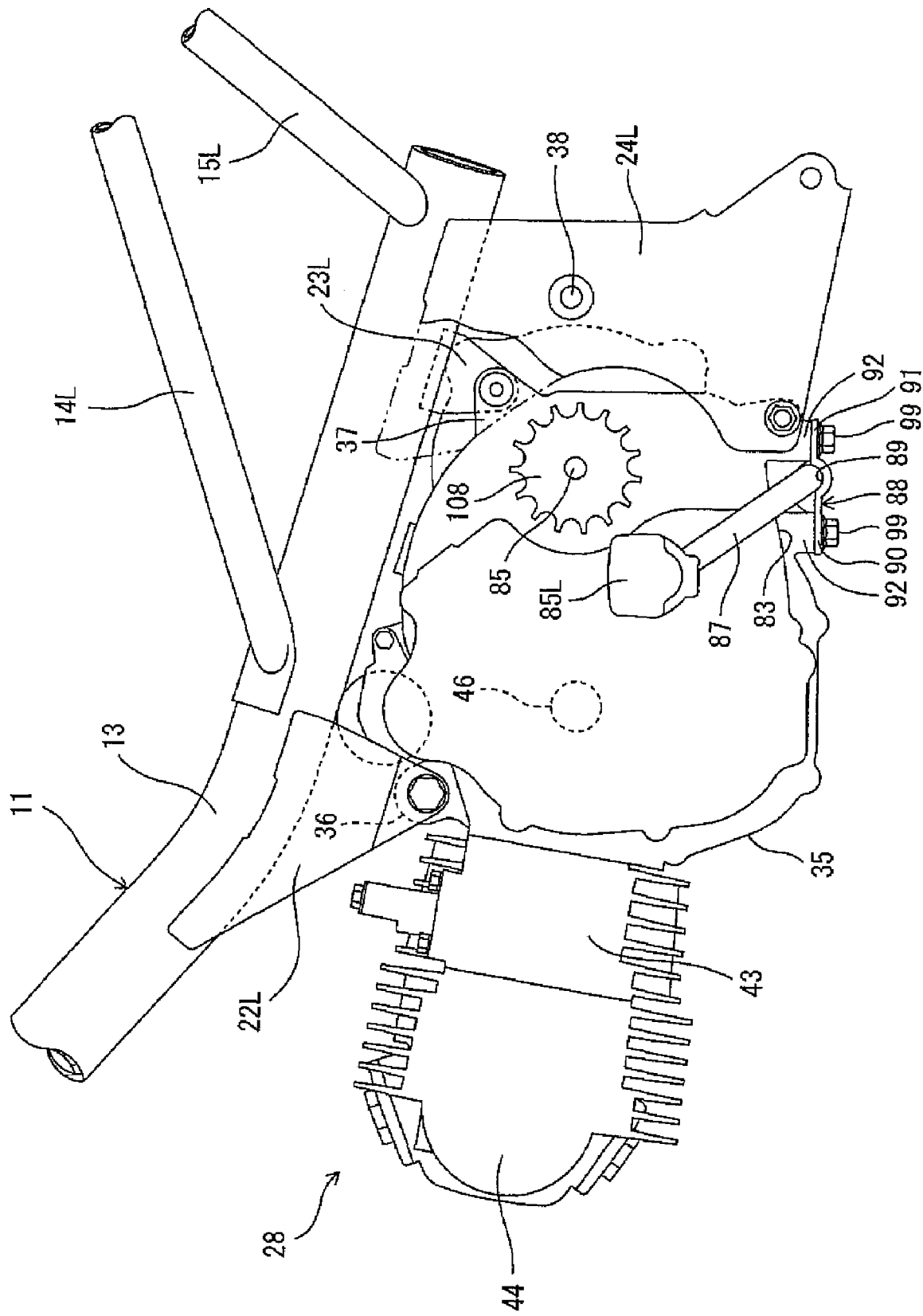
FIG. 6 is a left side view of the engine unit.

Referring to FIG. 1, the body frame 11 supports an engine unit 28 that drives the rear wheel 26. Specifically, as shown in FIG. 6, the engine unit 28 includes a crankcase 35, a cylinder 43, and a cylinder head 44. The crankcase 35 includes first and second engine mounting portions 36 and 37. The first engine mounting portion 36 projects upward from the top of the front end of the crankcase 35, and is supported by the first engine brackets 22R and 22L, while the second engine mounting portion 37 projects obliquely upward toward the rear from the top of the rear end of the crankcase 35, and is supported by the second engine brackets 23R and 23L (see also FIG. 7). Thus, the crankcase 35 is suspended by the main frame 13.

As will be specifically described later, the engine unit 28 includes an engine 29 and a belt continuously variable transmission (hereinafter, referred to as a CVT) 30 (see FIG. 8). While the type of the engine 29 is not limited, the engine 29 of the embodiment is a four-cycle single-cylinder engine.

As shown in FIG. 1, the motorcycle 10 includes a front fender 31 that covers the upper and rear of the front wheel 19 and a rear fender 32 that covers the upper rear portion of the rear wheel 26.

The motorcycle 10 further includes, in addition to the body cover 21, a front cowl 33 and right and left leg shields 34R and 34L. The leg shields 34R and 34L are covers that cover the front of rider's legs, which extend obliquely downward from above, as viewed from the side. The leg shields 34R and 34L may be integrated with the front cowl 33, or alternatively, may be separated from front cowl 33.

Referring to FIG. 3, the leg shields 34R and 34L are of a concaved shape open to the rear in horizontal section. In other words, the leg shields 34R and 34L are shaped like a substantially C-shaped curve tapered down toward the front in cross section.

Figure 2:
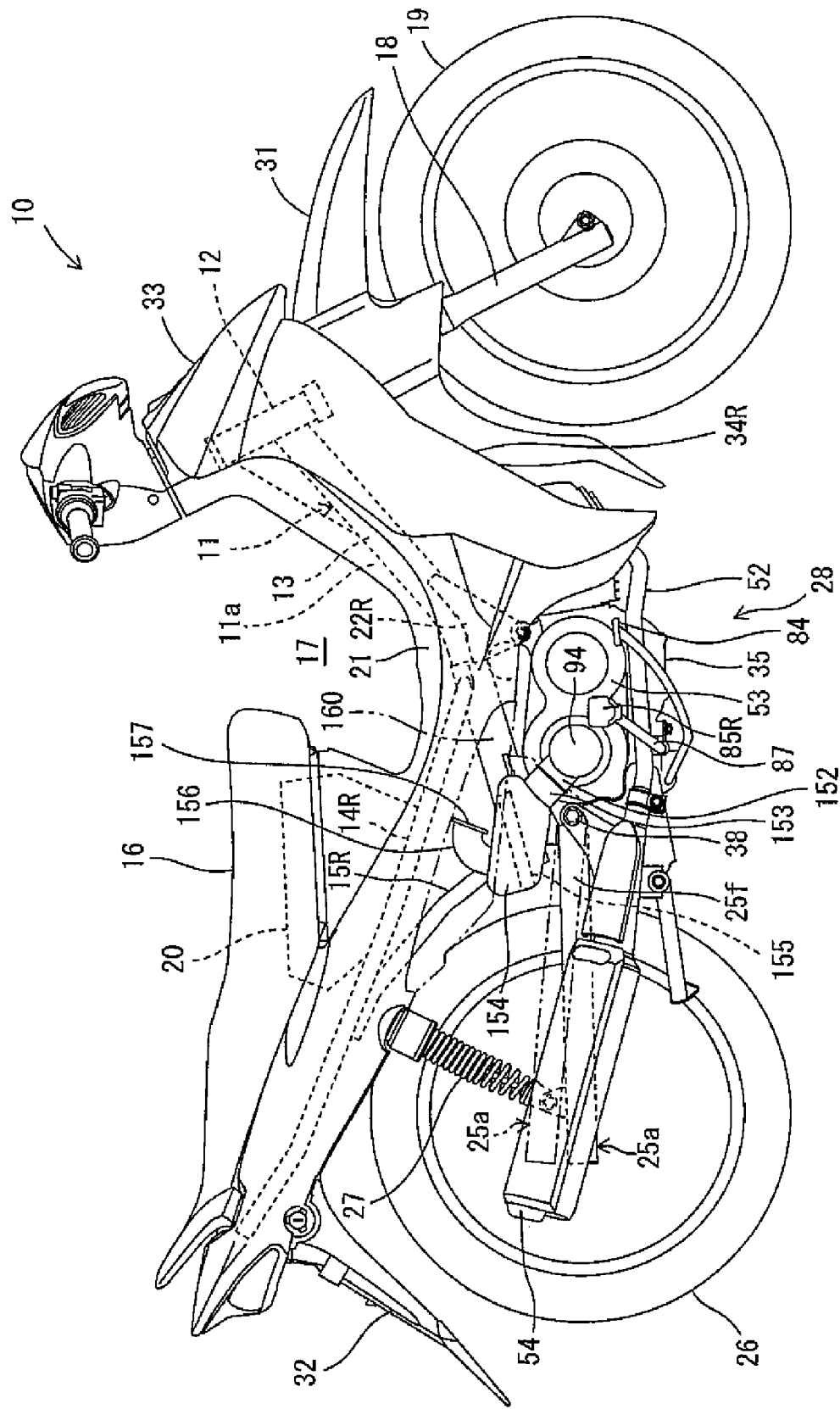
FIG. 2 is a side view of the motorcycle according to the first embodiment, with the cover thereof omitted.

Referring to FIGS. 2 and 4, an air chamber 154 is disposed above the front part 25f of the right arm 25a of the rear arm 25. The front part 25f of the arm 25a denotes the forward part of the arm 25a relative to the middle thereof in the front-back direction. In this embodiment, the air chamber 154 is disposed above the part about one quarter to one third of the entire length of the arm 25a of the rear arm 25 from the front end toward the rear.

The air chamber 154 connects to an air intake duct 153. The part of the air intake duct 153 adjacent to the air chamber 154 is also disposed above the front part 25f of the arm 25a of the rear arm 25. Alternatively, the air intake duct 153 may be disposed above the front part 25f of the arm 25a. Most of the air intake duct 153 may be disposed above the front part 25f of the arm 25a.

While the shape of the air chamber 154 is not limited at all, the air chamber 154 of the embodiment is shaped in a substantially rectangular parallelepiped that is long in the front-rear direction. The height of the air chamber 154 is about a half of the length, and the width is also about one half of the length. As shown in FIG. 3, the width of the air chamber 154 is narrower at the rear than at the front. The surface of the air chamber 154 inside in the width direction (on the left) has a shape along the seat rail 14R in plan view. The surface of the air chamber 154 outside in the width direction (on the right) is parallel with the front-rear direction.

Referring to FIG. 2, an intake duct 156 is disposed on the top of the air chamber 154. The intake duct 156 is a bent pipe, whose intake port 157 is open obliquely downward toward the front. However, the orientation of the opening of the intake port 157 is not limited at all. The intake port 157 may be open toward the front, obliquely upward toward the front, or to another direction. The air chamber 154 accommodates a filter 155.

In the embodiment, the air chamber 154 is made of resin. However, the material of the air chamber 154 is not limited at all.

Referring to FIG. 1, the upper right side of the air chamber 154 and the right side of the intake duct 156 are covered with a cover 160. The cover 160, which covers part of the main frame 13 and the seat-pillar tube 15R from the side, is separate from the body cover 21 that covers the seat rails 14R and 14L. The cover 160 may be integrated with the body cover 21 provided that it does not obstruct downsizing of the vehicle. In short, the cover 160 may be part of the body cover 21.

Referring to FIG. 3, footrests 85R and 85L made of rubber or the like are disposed on the right and left of the engine unit 28. The footrests 85R and 85L are members for rider's feet to place on. The right and left footrests 85R and 85L are each supported by the crankcase 35 of the engine unit 28 with a metal connecting rod 87 and a mounting plate 88 (see FIGS. 5 and 6) fixed to the connecting rod 87.

Figure 5:
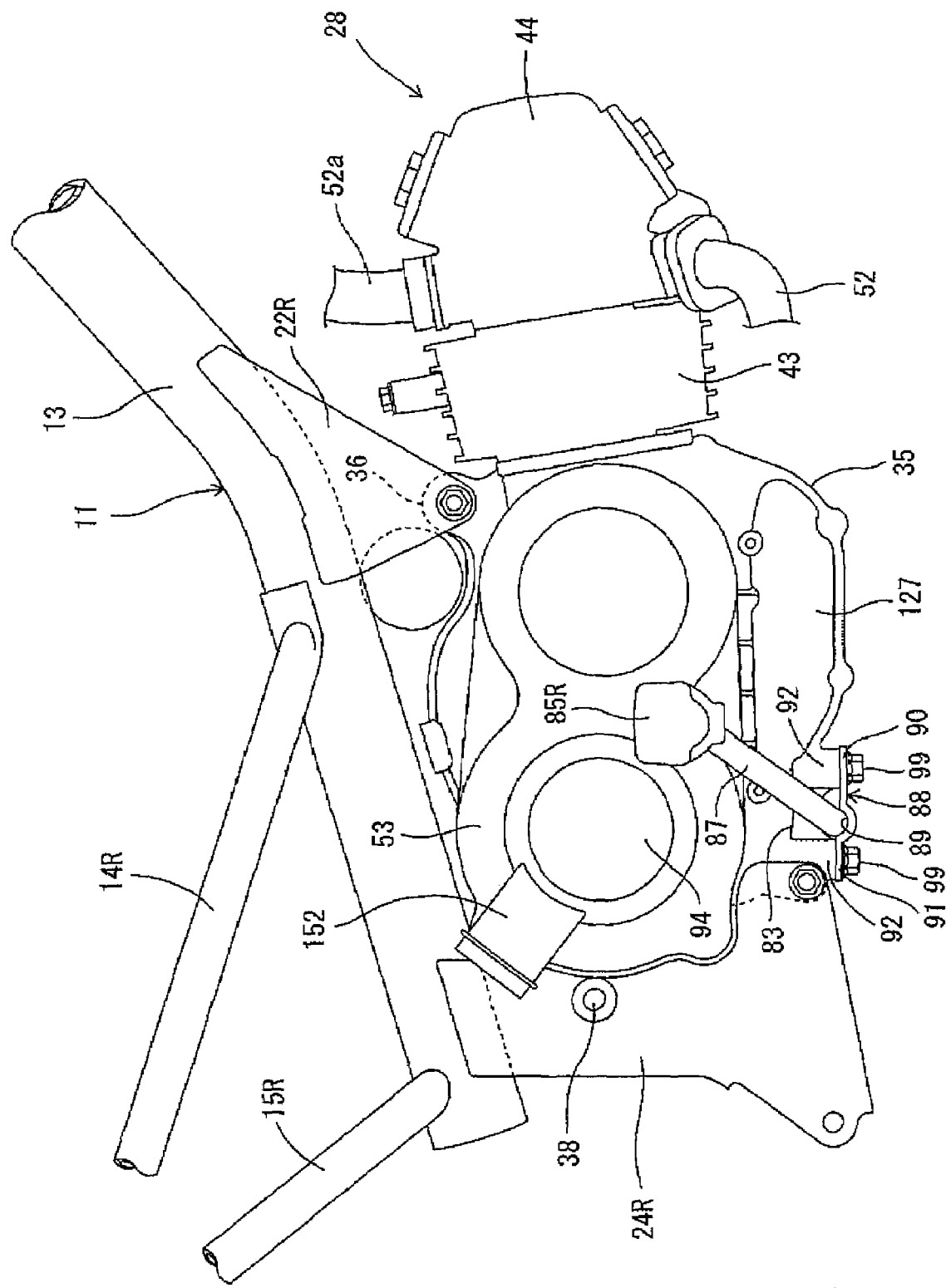
FIG. 5 is a right side view of the engine unit.

The connecting rod 87 passes through the lower part of the rear half of the crankcase 35 to extend across the vehicle width. The left end of the connecting rod 87 projects to the left of the crankcase 35 to support the left footrest 85L. The right end of the connecting rod 87 projects to the right of a transmission case 53 to support the right footrest 85R. Referring to FIG. 5, the mounting plate 88 is a stamped metal plate, which has a recess 89 in the middle thereof in the front-back direction for the connecting rod 87 to fit in. The recess 89 is in contact with the connecting rod 87 from below, and is welded to the outer circumference of the connecting rod 87.

The mounting plate 88 includes a flange-like first mounting portion 90 extending to the front of the connecting rod 87 and a flange-like second mounting portion 91 extending to the rear of the connecting rod 87. The first mounting portion 90 and the second mounting portion 91 extend along the axis of the connecting rod 87 (in the lateral direction), and face the lower surface 83 of the rear half of the crankcase 35.

The lower surface 83 of the rear half of the crankcase 35 has four bosses 92 (only two are shown in FIG. 5). The bosses 92 project downward from the lower surface 83 of the crankcase 35, and are integrated with the crankcase 35. The bosses 92 each have a bolt hole (not shown). The mounting plates 88 of the footrests 85R and 85L also have bolt holes (not shown) in the positions corresponding to the bosses 92. The mounting plates 88 and the bosses 92 are tightened with bolts 99. Thus, the footrests 85R and 85L are secured to the crankcase 35 with the bolts 99 with the connecting rod 87 and the mounting plate 88 therebetween.

Referring to FIGS. 1 and 3, a brake pedal 84 is disposed in front of the right footrest 85R. The brake pedal 84 passes below the transmission case 53 to project obliquely right toward the front, and extends obliquely upward toward the front on the right of the transmission case 53. As shown in FIG. 3, during the driving of the motorcycle 10, a rider's right foot 62a is disposed next to the transmission case 53 and an air intake duct 134 in the vehicle width direction.

The inner structure of the engine unit 28 will next be described. Referring to FIG. 8, the engine unit 28 includes the engine 29, the CVT 30, a centrifugal clutch 41, and a reduction mechanism 42.

The engine 29 includes the crankcase 35, the cylinder 43 connected to the crankcase 35, and the cylinder head 44 connected to the cylinder 43. The crankcase 35 includes divided two case blocks, that is, a first case block 35a on the left and a second case block 35b on the right. The first case block 35a and the second case block 35b are opposed to each other along the width of the vehicle.

The crankcase 35 accommodates a crankshaft 46. The crankshaft 46 extends horizontally across the vehicle width. The crankshaft 46 is supported by the first case block 35a with a bearing 47 therebetween, and is supported by the second case block 35b with a bearing 48 therebetween.

A piston 50 is slidably placed in the cylinder 43. The piston 50 connects to one end of a connecting rod 51. A crankpin 59 is disposed between the left crank arm 46a and the right crank arm 46b of the crankshaft 46. The other end of the connecting rod 51 connects to the crankpin 59.

The cylinder head 44 has a recess 44a and an intake port and an exhaust port (not shown) communicating with the recess 44a. A spark plug 55 is placed in the recess 44a of the cylinder head 44. Referring to FIG. 5, the intake port connects to an intake pipe 52a, while the exhaust port connects to an exhaust pipe 52. Referring to FIGS. 1 and 3, the exhaust pipe 52 extends from the cylinder head 44 toward the rear and obliquely rightward and downward, and passes below the transmission case 53 of the engine unit 28 to extend rearward into connection with a muffler 54 on the right of the rear wheel 26.

Figure 8:
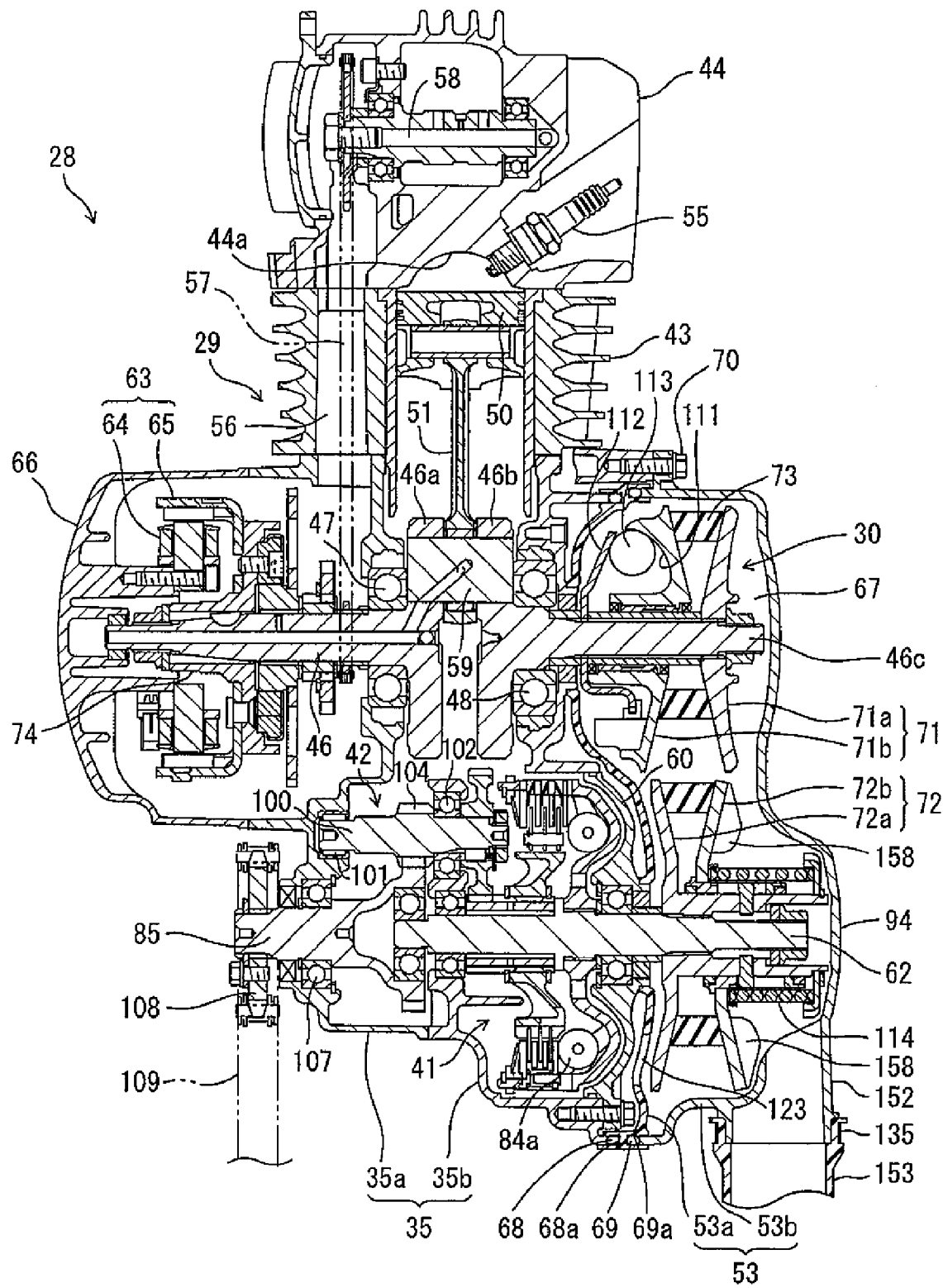
FIG. 8 is a sectional view showing the inner structure of the engine unit.

Referring to FIG. 8, the cylinder 43 contains a cam chain chamber 56 on the left therein, which connects the interior of the crankcase 35 with the interior of the cylinder head 44. The cam chain chamber 56 has a timing chain 57. The timing chain 57 is wound around the crankshaft 46 and a camshaft 58. The camshaft 58 rotates with the rotation of the crankshaft 46 to switch an intake valve and an exhaust valve (not shown).

A generator case 66 for a generator 63 is detachably mounted to the left of the front half of the first case block 35a. The transmission case 53 for the CVT 30 is mounted to the right of the second case block 35b.

The second case block 35b has an opening on the right of the rear half thereof the opening being closed with a clutch cover 60. The clutch cover 60 is detachably fixed to the second case block 35b with a bolt 61 (see FIG. 9).

The transmission case 53 is separate from the crankcase 35, and is composed of an inner case 53a covering the inside in the vehicle width direction (the left) of the CVT 30 and an outer case 53b covering the outside in the vehicle width direction (the right) of the CVT 30. The inner case 53a is mounted to the right of the crankcase 35, while the outer case 53b is mounted to the right of the inner case 53a. The inner case 53a and the outer case 53b have a belt chamber 67 for housing the CVT 30.

Referring to FIG. 8, the right end of the crankshaft 46 passes through the second case block 35b and the inner case 53a into the belt chamber 67. The right end of the crankshaft 46 is fitted with a primary sheave 71 of the CVT 30. The primary sheave 71 therefore rotates with the rotation of the crankshaft 46. The right part of the crankshaft 46 (strictly speaking, a part on the right of the bearing 48) constitutes a primary sheave shaft 46c.

On the other hand, the left end of the crankshaft 46 passes through the first case block 35a into the generator case 66. The left end of the crankshaft 46 is fitted with the generator 63. The generator 63 includes a stator 64 and a rotor 65 opposed to the stator 64. The rotor 65 is secured to a sleeve 74 that rotates with the crankshaft 46. The stator 64 is secured to the generator case 66.

Figure 9:
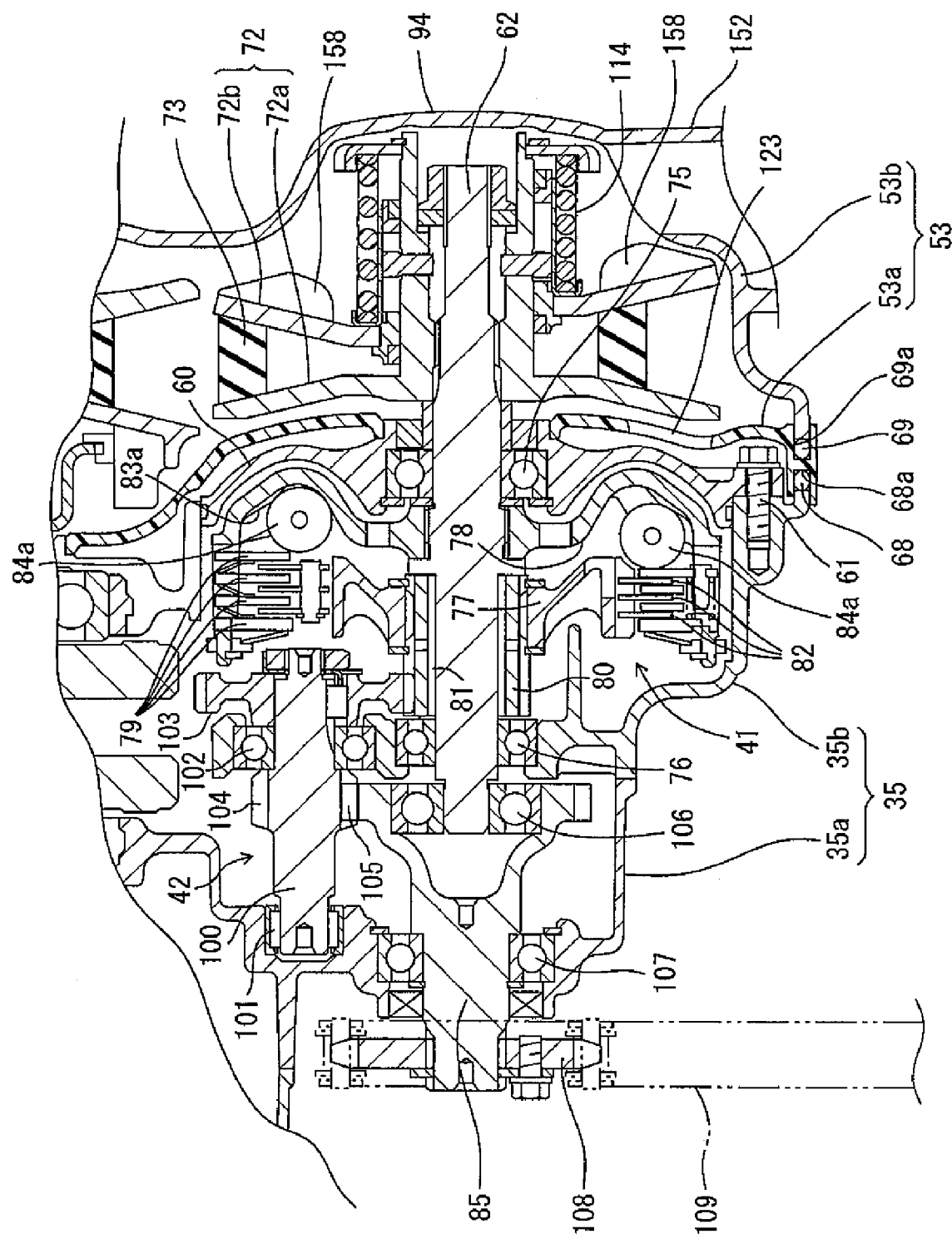
FIG. 9 is a fragmentary sectional view of the inner structure of the engine unit.

The crankcase 35 contains a secondary sheave shaft 62 at the rear half, in parallel with the crankshaft 46. Referring to FIG. 9, the right part at the center of the secondary sheave shaft 62 is supported by the clutch cover 60 with a bearing 75. The left of the secondary sheave shaft 62 is supported by the left end of the second case block 35b with a bearing 76. The right end of the secondary sheave shaft 62 passes through the second case block 35b and the clutch cover 60 into the belt chamber 67. The right end of the secondary sheave shaft 62 connects to a secondary sheave 72 of the CVT 30.

Referring to FIG. 8, the CVT 30 includes the primary sheave 71, the secondary sheave 72, and a V-belt 73 wound around the primary sheave 71 and the secondary sheave 72. As has been described, the primary sheave 71 is mounted to the right of the crankshaft 46. The secondary sheave 72 connects to the right of the secondary sheave shaft 62.

The primary sheave 71 includes a fixed sheave half 71a located outside in the vehicle width direction and a moving sheave half 71b located inside in the vehicle width direction and opposed to the fixed sheave half 71a. The fixed sheave half 71a is secured to the right end of the primary sheave shaft 46c, and thus rotates with the primary sheave shaft 46c. The moving sheave half 71b is located on the left of the fixed sheave half 71a, and is slidably mounted to the primary sheave shaft 46c. Accordingly, the moving sheave half 71b rotates with the primary sheave shaft 46c, and is slidable along the axis of the primary sheave shaft 46c. A belt groove is provided between the fixed sheave half 71a and the moving sheave half 71b. The moving sheave half 71b has a cam surface 111 on the left side. A cam plate 112 is disposed on the left of the cam surface 111. A roller weight 113 is disposed between the cam surface 111 of the moving sheave half 71b and the cam plate 112.

The secondary sheave 72 includes a fixed sheave half 72a located inside in the vehicle width direction and a moving sheave half 72b located inside in the vehicle width direction and opposed to the fixed sheave half 72a. The moving sheave half 72b is mounted to the right end of the secondary sheave shaft 62. The moving sheave half 72b thus rotates with the secondary sheave shaft 62, and is slidable along the axis of the secondary sheave shaft 62. A compression coil spring 114 is disposed at the right end of the secondary sheave shaft 62. The moving sheave half 72b is given a leftward biasing force from the compression coil spring 114. The shaft center of the fixed sheave half 72a is a cylindrical slide collar, which is splined to the secondary sheave shaft 62.

The moving sheave half 72b of the secondary sheave 72 has a plurality of fan blades 158 on the right of the moving sheave half 72b. The blades 158 introduce air from the air intake duct 153 into the belt chamber 67, and conveys the air in the belt chamber 67 to the exterior. In this embodiment, the blades 158 extend radially outward from the center of the moving sheave half 72b to the exterior in a spiral, as viewed from the side. The concrete shape and the number of the blades 158 are not limited at all. Alternatively, an impeller separate from the moving sheave half 72b may be provided outside the moving sheave half 72b. This also corresponds to "fan blades formed outside the moving sheave half 72b".

The axle ratio of the CVT 30 is determined according to the magnitude relation between the rightward force of the roller weight 113 to push the moving sheave half 71b of the primary sheave 71 and the leftward force of the compression coil spring 114 to push the moving sheave half 72b of the secondary sheave 72.

Specifically, when the rotational speed of the primary sheave shaft 46c increases, the roller weight 113 moves radially outward by the centrifugal force to push the moving sheave half 71b to the right. Then the moving sheave half 71b is moved to the right to increase the belt-winding diameter of the primary sheave 71. Thus, the belt-winding diameter of the secondary sheave 72 decreases, so that the moving sheave half 72b of the secondary sheave 72 moves rightward against the biasing force of the compression coil spring 114. As a result, the winding diameter of the primary sheave 71 for the V-belt 73 is increased, while the winding diameter of the secondary sheave 72 is decreased, so that the axle ratio is decreased.

In contrast, when the rotational speed of the primary sheave shaft 46c decreases, the centrifugal force of the roller weight 113 decreases. Thus, the roller weight 113 moves radially inward along the cam surface 111 of the moving sheave half 71b and the cam plate 112. The rightward pressure of the roller weight 113 to the moving sheave half 71b is therefore decreased. Then, the biasing force of the compression coil spring 114 becomes larger than the rightward force to move the moving sheave half 72b of the secondary sheave 72 leftward, and accordingly, also the moving sheave half 71b of the primary sheave 71 moves leftward. As a result, the belt winding diameter of the primary sheave 71 is decreased, while the belt winding diameter of the secondary sheave 72 is increased, so that the axle ratio is increased.

As shown in FIG. 8, a bowl-like expanding portion 94 expanding outward (rightward) in the vehicle width direction is formed at the outer case 53b adjacent to the end of the secondary sheave shaft 62. As shown in FIG. 2, a connecting pipe 152 is provided at the upper rear of the expanding portion 94. The connecting pipe 152 is integrated with the outer case 53b. The connecting pipe 152 connects to the air chamber 154 via the air intake duct 153. The way of connecting the connecting pipe 152 and the air intake duct 153 is not limited at all. In this embodiment, as shown in FIG. 8, the connecting pipe 152 and the air intake duct 153 are secured to each other with a band 135. The connecting pipe 152 and the air intake duct 153 may be screwed to each other. Alternatively, the connecting pipe 152 and the air intake duct 153 may be joined to each other. Furthermore, the connecting pipe 152 and the air intake duct 153 may be integrated with each other. In other words, the connecting pipe 152 may extend obliquely upward toward the rear into direct connection with the air chamber 154.

As shown in FIG. 8, the right end of the connecting pipe 152 and the right end of the expanding portion 94 are substantially flush with each other in the vehicle width direction. As shown in FIG. 3, also the right end of the air chamber 154 is substantially flush with the right end of the expanding portion 94 of the transmission case 53. Therefore, the connecting pipe 152, the air intake duct 153, and the air chamber 154 do not protrude outward (rightward) more than the expanding portion 94. In other words, the air intake duct 153 and the air chamber 154 do not protrude more than the transmission case 53. Accordingly, the maximum width of the motorcycle 10 is not substantially increased even though the air intake duct 153 and the air chamber 154 are disposed, thus allowing downsizing of the vehicle.

Referring to FIG. 8, a seal groove 68a is formed at the left of the rim of the inner case 53a. The rim on the right of the second case block 35b is fitted in the seal groove 68a. An O-ring 68 is placed between the inner case 53a and the second case block 35b in the seal groove 68a. A seal groove 69a is formed at the right of the rim of the inner case 53a, in which the rim of the outer case 53b is fitted. An O-ring 69 is placed between the inner case 53a and the outer case 53b in the seal groove 69a. The outer case 53b and the second case block 35b are tightened with a bolt 70, with the inner case 53a therebetween.

Figure 10:
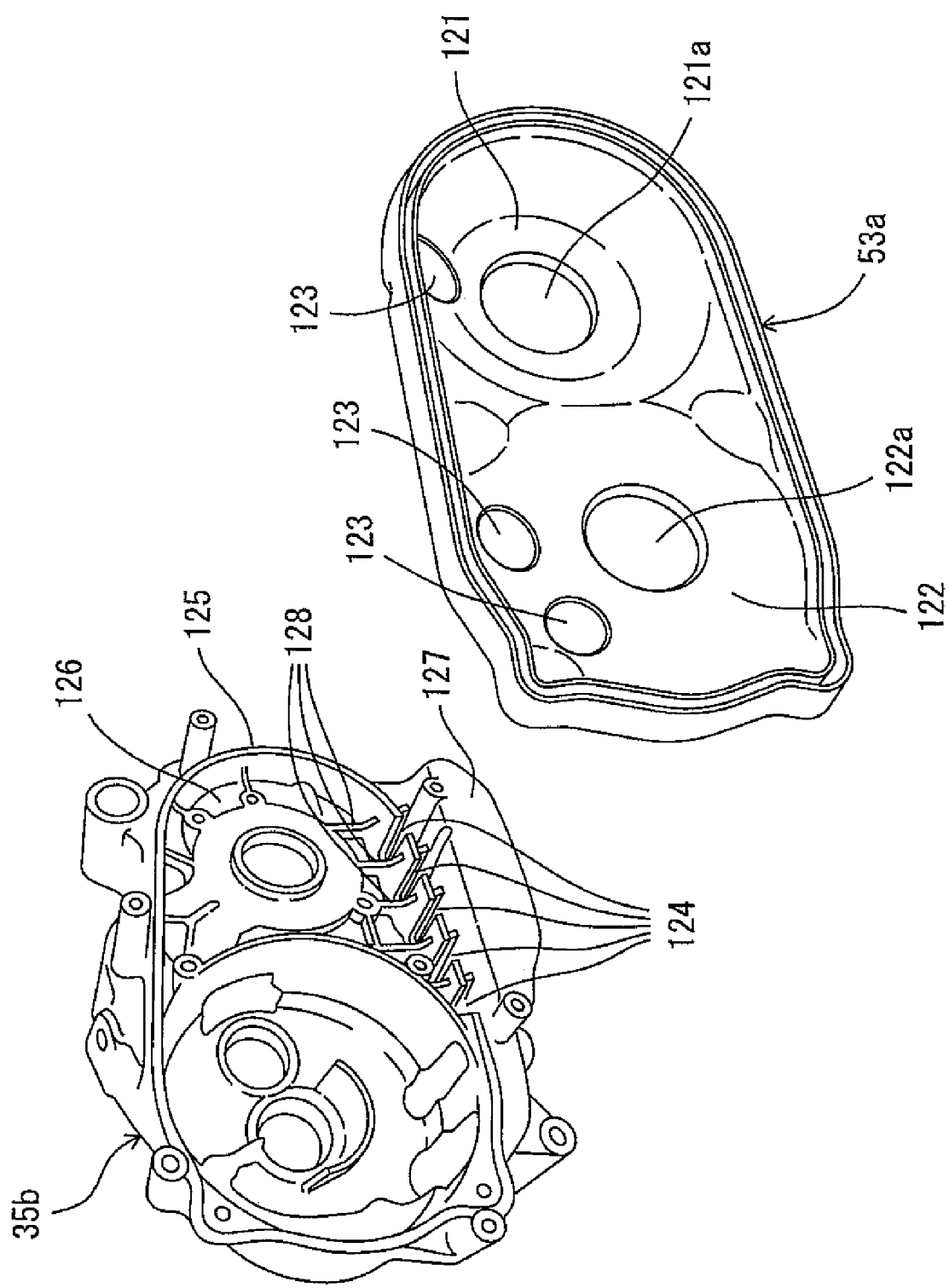
FIG. 10 is an exploded perspective view of a second case block and an inner case of a transmission case.

Referring to FIG. 10, the front half 121 of the inner case 53a is shaped like a bowl expanding leftward, while the rear half 122 of the inner case 53a is shaped like a bowl expanding rightward. The front half 121 has a hole 121a for the primary sheave shaft 46c of the CVT 30 to pass through. The rear half 122 has a hole 122a for the secondary sheave shaft 62 of the CVT 30 to pass through. FIG. 10 omits the illustration of the clutch cover 60 (see FIG. 8) placed between the inner case 53a and the second case block 35b.

The inner case 53a has vent holes 123. In this embodiment, the vent holes 123 are circular in shape, which are disposed at three positions higher than the center of the inner case 53a. However, the shape of the vent holes 123 is not limited at all. The vent holes 123 are not necessarily at the upper part of the inner case 53a. In this embodiment, the vent holes 123 are provided at both of the front half 121 and the rear half 122 of the inner case 53a. Alternately, the vent holes 123 may be provided at one of the front half 121 and the rear half 122. Also the number of the vent holes 123 is not particularly limited.

The second case block 35b has a plurality of vent holes 124 at the lower part on the right thereof. Specifically, the second case block 35b has a rightward erecting rim 125. The rim 125 has a shape corresponding to the outline of the transmission case 53. The lower part of the rim 125 is cut off into slits, a so-called comb-shape. Therefore, a space 126 defined by the second case block 35b and the inner case 53a communicates with the outside of the engine unit 28 through the vent holes 124. Since the right part of the rear half of the second case block 35b is covered with the clutch cover 60, the space 126 at the rear half of the second case block 35b is formed between the clutch cover 60 and the inner case 53a.

The comb-shaped part of the rim 125 has a reinforcing rib 128. An oil pan 127 is provided under the vent holes 124.

Figure 11:
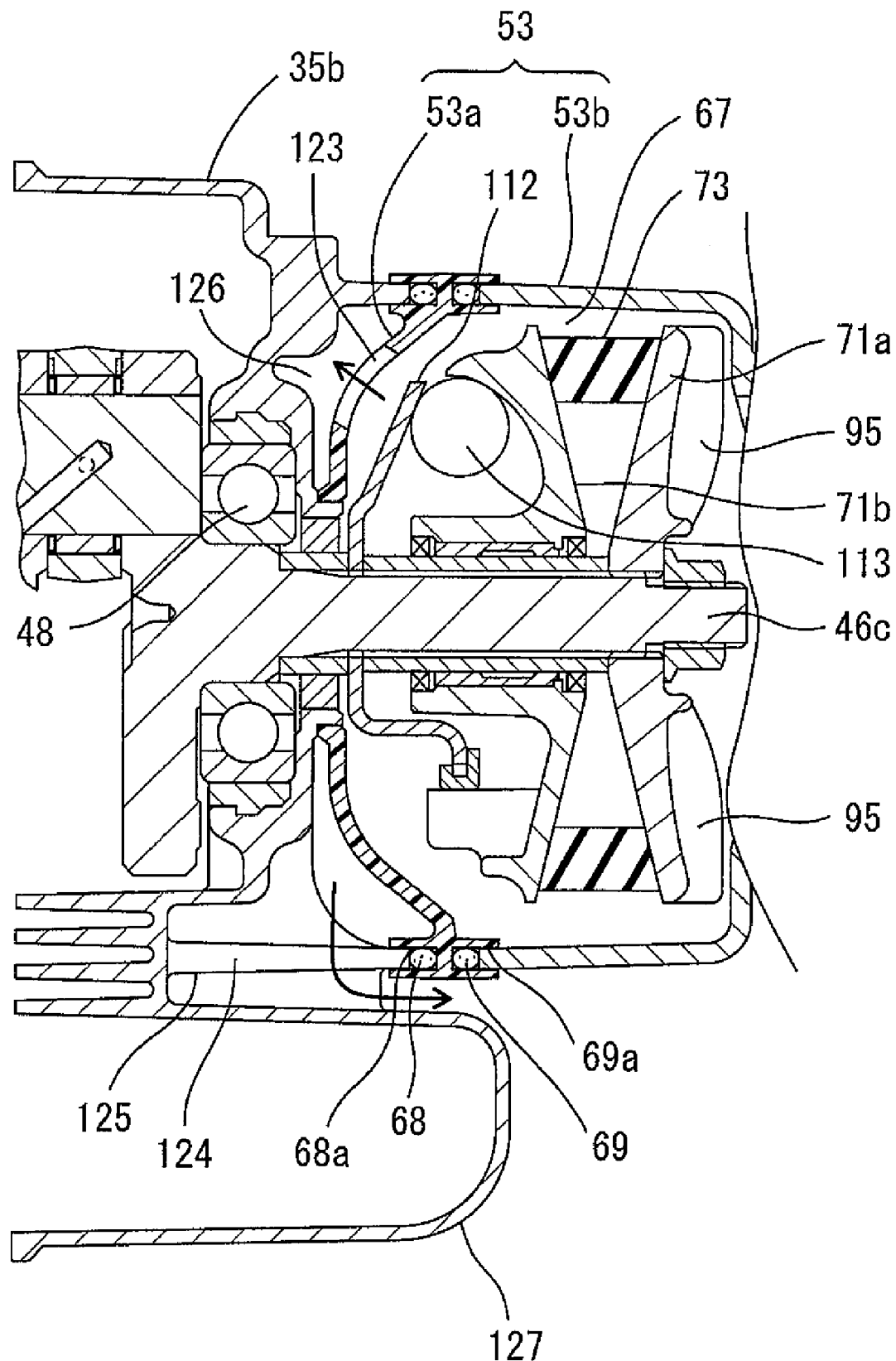
FIG. 11 is a cross-sectional view of the second case block and the transmission case.

Referring to FIG. 11, with the above structure, the air in the belt chamber 67 is introduced into the space 126 through the vent holes 123 of the inner case 53a, and is in turn discharged toward the oil pan 127 through the vent holes 124 of the second case block 35b. As a result, the air is discharged to the exterior of the engine unit 28.

In this embodiment, the lower part of the rim 125 of the second case block 35b is shaped like a comb to form the plurality of slit-like vent holes 124. Of course, the shape of the vent holes 124 may not be only the slits but may be another form such as circles. The shape, size, and number of the vent holes 124 of the second case block 35b are not limited at all.

Referring to FIG. 9, the centrifugal clutch 41 is mounted to the left of the secondary sheave shaft 62. The centrifugal clutch 41 is a multiplate wet clutch, which has a substantially cylindrical clutch housing 78 and a clutch boss 77. The clutch housing 78 is splined to the secondary sheave shaft 62, and rotates therewith. The clutch housing 78 is fitted with a plurality of ring-shaped clutch discs 79. The clutch discs 79 are arranged along the axis of the secondary sheave shaft 62 at intervals.

Around the left part of the secondary sheave shaft 62, a cylindrical gear 80 is rotatably fitted with a bearing 81. The clutch boss 77 is disposed radially inside the clutch discs 79 and radially outside the gear 80, and in engagement with the gear 80. Thus, the gear 80 rotates with the clutch boss 77. A plurality of ring-shaped friction discs 82 is mounted radially outside the clutch boss 77. The friction discs 82 are arranged along the axis of the secondary sheave shaft 62 at intervals, and are disposed between the adjacent clutch discs 79.

A plurality of cam surfaces 83a is formed on the left of the clutch housing 78. Roller weights 84a are disposed between the cam surfaces 83a and the rightmost clutch disc 79 facing the cam surfaces 83a.

The centrifugal clutch 41 is automatically switched between a clutch-in state (connected state) and a clutch-off state (disconnected state) depending on the magnitude of the centrifugal force applied to the roller weights 84a.

Specifically, when the rotation speed of the clutch housing 78 exceeds a predetermined speed, the roller weights 84a move radially outward by centrifugal force to push the clutch discs 79 leftward. As a result, the clutch discs 79 and the friction discs 82 are brought into pressure contact with each other into a clutch-in state in which the driving force of the secondary sheave shaft 62 is transmitted to an output shaft 85 via the centrifugal clutch 41.

In contrast, when the rotation speed of the clutch housing 78 becomes less than a predetermined speed, the centrifugal force applied to the roller weights 84a decreases to move the roller weights 84a radially inward. As a result, the pressure contact between the clutch discs 79 and the friction discs 82 is released into a clutch-off state in which the driving force of the secondary sheave shaft 62 is not transmitted to the output shaft 85. Referring to FIG. 9, the front part (the upper part in FIG. 9) of the centrifugal clutch 41 indicates the clutch-off state, while the rear part (the lower part in FIG. 9) indicates the clutch-in state.

The reduction mechanism 42 is disposed between the centrifugal clutch 41 and the output shaft 85. The reduction mechanism 42 has a transmission shaft 100 parallel with the secondary sheave shaft 62 and the output shaft 85. The transmission shaft 100 is rotatably supported by the first case block 35a with a bearing 101, and supported by the second case block 35b with a bearing 102. At the right end of the transmission shaft 100, a first speed-change gear 103 in engagement with the gear 80 is provided.

The transmission shaft 100 has a second speed-change gear 104 smaller in diameter than the first speed-change gear 103 at the center thereof. A third speed-change gear 105 in engagement with the second speed-change gear 104 is provided around the outer periphery at the right end of the output shaft 85. The inner periphery at the right end of the output shaft 85 is supported by the left end of the secondary sheave shaft 62 with a bearing 106. Thus, the output shaft 85 is rotatably supported by the secondary sheave shaft 62 coaxially therewith (on a straight line) with the bearing 106. The center of the output shaft 85 is rotatably supported by the left end of the second case block 35b with a bearing 107.

With this arrangement, the clutch boss 77 and the output shaft 85 are connected to each other with the gear 80, the first speed-change gear 103, the transmission shaft 100, the second speed-change gear 104, and the third speed-change gear 105 therebetween. Thus, the output shaft 85 rotates with the rotation of the clutch boss 77.

The left end of the output shaft 85 passes through the first case block 35a to project to the exterior of the crankcase 35. The left end of the output shaft 85 is secured to a drive sprocket 108. Around the drive sprocket 108, a chain 109 is wound as a power transmission mechanism for transmitting the driving force of the output shaft 85 to the rear wheel 26. The power transmission mechanism is not limited to the chain 109 but may be a transmission belt, a gear mechanism composed of a plurality of gears, a drive shaft, or another member.

The above is the structure of the motorcycle 10. The cooling operation of the CVT 30 will now be described.

Upon activation of the engine unit 28, the primary sheave 71 and the secondary sheave 72 of the CVT 30 rotate, and thus the blades 158 of the moving sheave half 72b of the secondary sheave 72 rotate. As a result, an attracting force that introduces air through the air intake duct 153 into the belt chamber 67 is generated.

Then, the air is drawn into the air chamber 154 through the intake port 157 of the intake duct 156 (see FIG. 2). The air is purified through the filter 155, and is then drawn into the belt chamber 67 through the air intake duct 153 and the connecting pipe 152. The air drawn into the belt chamber 67 flows around and cools the secondary sheave 72, the primary sheave 71, and the V-belt 73.

The air that cooled the primary sheave 71, the secondary sheave 72, and the V-belt 73 is discharged from the belt chamber 67 through the vent holes 123 of the inner case 53a (see FIG. 11) into the space 126 between the inner case 53a and the second case block 49b. The air in the space 126 is discharged to the exterior of the engine unit 28 through the vent holes 124 at the lower part of the second case block 35b. Thus the CVT 30 is continuously cooled by the flow of the air.

According to the embodiment, the air chamber 154 constituting at least part of the cooling air passage of the CVT 30 is disposed above the front part 25f of one arm 25a of the rear arm 25 (see FIG. 1). Therefore, the space above the front part 25f of the arm 25a is used effectively as a space for installing a cooling air passage. Thus, sufficient air-passage installation space is provided without upsizing of the body cover 21. As a result, an air passage having a sufficient flow channel cross-sectional area can be provided, thus enabling both an increase in cooling performance of the CVT 30 and downsizing of the body cover 21. According to the embodiment, both an increase in the reliability of the CVT 30 and the downsizing of the motorcycle 10 are achieved.

According to the embodiment, the air intake duct 153 and the air chamber 154 are disposed opposite to the chain 109 in the crosswise direction of the motorcycle 10. Specifically, the chain 109 is disposed at the left half of the motorcycle 10, while the air intake duct 153 and the air chamber 154 are disposed at the right half of the motorcycle 10. This arrangement facilitates preventing the interference between the air intake duct 153 and the chain 109 and the interference between the air chamber 154 and the chain 109. Thus, a sufficient space for installing the air intake duct 153 and the air chamber 154 is easily provided. The crosswise position of the air intake duct 153 and the air chamber 154 is not limited at all; for example, the air intake duct 153 and the air chamber 154 may be disposed at the left half of the motorcycle 10, while the power transmission mechanism such as the chain 109 may be disposed at the right half of the motorcycle 10.

Referring to FIG. 1, according to the embodiment, the air chamber 154 is disposed at a position overlapping with the rear-arm bracket 24R, as viewed from the side. In this embodiment, as described above, the cylinder 43 and the cylinder head 44 of the engine 29 (see FIG. 5) project forward from the crankcase 35, while the air chamber 154 is disposed opposite to the engine 29. Therefore, the space opposite to the engine 29 is effectively used, allowing downsizing of the motorcycle 10. Since the air chamber 154 is disposed apart from the engine 29, the air in the air chamber 154 is hardly heated by the engine 29. Thus, lower-temperature air is supplied to the belt chamber 67, improving the cooling performance of the CVT 30.

In this embodiment, the air chamber 154 is disposed outside the rear-arm bracket 24R. However, the air chamber 154 may also be disposed inside the rear-arm bracket 24R.

According to the embodiment, as shown in FIG. 8, the end of the secondary sheave shaft 62 is located outside the end of the primary sheave shaft 46c in the vehicle width direction.

That is, the secondary sheave shaft 62 projects outward more than the primary sheave shaft 46c. Therefore, the air passage from the air chamber 154 to the belt chamber 67 is made relatively straight by connecting the air intake duct 153 with the secondary sheave shaft 62 of the transmission case 53. This decreases the bent of the air passage to thereby reduce the resistance of the air flowing in the air passage, thus improving the cooling performance of the CVT 30.

Referring to FIG. 3, the embodiment has the footrest 85R for supporting the rider's foot 62a outside the transmission case 53 in the vehicle width direction in plan view. The transmission case 53 and the air intake duct 153 are disposed crosswise inside (on the left of) the footrest 85R. Thus, the space inside the footrest 85R is used effectively as an installation space for the transmission case 53 and the air intake duct 153. Since the air intake duct 153 is directed straight to the transmission case 53 without being obstructed by the footrest 85R, the resistance to the circulation of air in the air intake duct 153 is reduced. This further improves the cooling performance of the CVT 30.

As shown in FIG. 3, the exhaust pipe 52 of the engine 29 extends rearward below the transmission case 53 and the air intake duct 153, and passes below the pivot shaft 38, as viewed from the side. This arrangement prevents interference between the exhaust pipe 52, the air intake duct 153 and so on. Accordingly, a sufficient cross-sectional area of the air intake duct 153 and so on is provided without being obstructed by the exhaust pipe 52.

As shown in FIG. 1, the intake port 157 of the intake duct 156 of the air chamber 154 is open to the space in the cover 160 that covers the frames below the seat 16 (that is, part of the main frame 13 and the seat pillar tube 15R). Thus the intake port 157 is covered with the cover 160, thus preventing the entry of water and dust or the like into the air chamber 154. This arrangement thus prevents the entry of water and dust or the like into the belt chamber 67, improving the reliability of the CVT 30.

Referring to FIG. 8, according to the embodiment, the fan blades 158 are disposed outside the moving sheave half (outside sheave half) 72b of the secondary sheave 72. This arrangement enables the air in the air chamber 154 to be smoothly introduced into the belt chamber 67, thus further improving the cooling performance of the CVT 30.

Referring to FIG. 3, the seat rail 14R has a frame 14a directed crosswise outside toward the rear, and the air chamber 154 is shaped along the frame 14a. In other words, the width of the air chamber 154 is narrower at the rear than at the front. Accordingly, although the frame 14a expands outward toward the rear, the air chamber 154 does not expand outward. Thus, the motorcycle 10 can be made small in width.

As shown in FIG. 1, this embodiment is what is called a moped motorcycle 10, in which the downward-recessed space 17 is provided in front of the seat 16, and the front end of the seat 16 is located more to the front than the front end of the rear arm 25. For this type of motorcycle 10, there is a strong demand for downsizing of the vehicle, particularly, downsizing of the side of the recessed space 17. According to the embodiment, since the air chamber 154 is disposed above the front part 25f of the arm 25a of the rear arm 25, there is no possibility of obstructing the downsizing of the vehicle due to the air chamber 154. Thus, the embodiment allows the downsizing of the vehicle.

Since the recessed space 17 is recessed downward in front of the seat 16, the front of the intake port 157 of the intake duct 156 disposed below the seat 16 is covered with the body cover 21. This arrangement therefore prevents the entry of water and dust into the intake port 157, improving the reliability of the CVT 30.

In this embodiment, the body frame 11 includes the rear-arm brackets 24L and 24R, and the two arms 25a of the rear arm 25 are disposed outside the rear-arm brackets 24R and 24L in the vehicle width direction, respectively. The air chamber 154 is disposed above the right arm 25a and outside the rear-arm bracket 24R in the vehicle width direction. This arrangement enables the air chamber 154 to be disposed compactly.

The arm 25a of the rear arm 25 pivots on the pivot shaft 38 as the rear wheel 26 moves up and down (refer to the arm 25a indicated by the phantom line in FIG. 2). In short, the arm 25a pivots about the front end thereof. Therefore, interference between the arm 25a and the air chamber 154 may occur with the pivoting motion of the arm 25a. However, as has been described, the air chamber 154 of the embodiment is disposed above the front part 25f of the arm 25a. Accordingly, even if the rear wheel 26 moves greatly up and down, interference between the air chamber 154 and the arm 25a is prevented because the up-and-down motion of the front part 25f of the arm 25a is smaller than that of the rear wheel 26.

Referring to FIG. 4, in this embodiment, the air chamber 154 is adjacent to the main frame 13 in the vehicle width direction. Alternatively, part of the air chamber 154 may extend inward in the vehicle width direction provided that the air chamber 154 and the main frame 13 interfere with each other.

In the embodiment, the pair of right and left rear-arm brackets 24R and 24L support the rear arm 25. The rear-arm bracket for supporting the rear arm 25 may not be the right and left pair but may be a single bracket.

Second Embodiment

Figure 12:
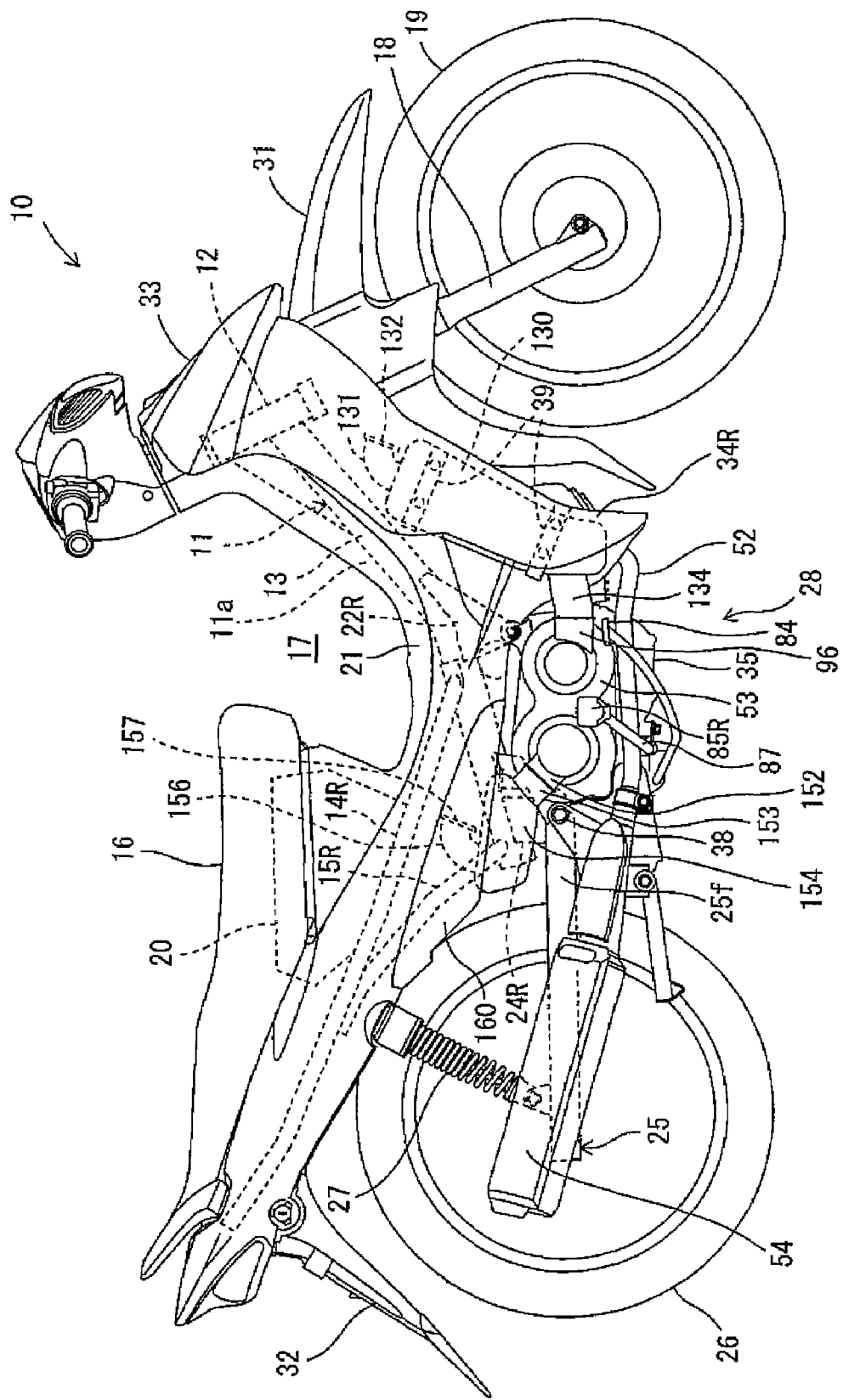
FIG. 12 is a side view of a motorcycle according to a second embodiment of the invention.

In the first embodiment, the air chamber 154 disposed above the front part 25f of the arm 25a of the rear arm 25 constitutes part of the intake passage for supplying air into the belt chamber 67. However, the air passage above the rear arm 25 is not limited to the intake passage. Referring to FIG. 12, a second embodiment is constructed such that the air chamber 154 disposed above the front part 25f of the arm 25a of the rear arm 25 is used as part of an exhaust passage for discharging the air in the belt chamber 67.

As shown in FIG. 12, a connecting pipe 96 is provided at the front of the outer case 53b of the transmission case 53, to which the air intake duct 134 is connected. The upper stream of the air intake duct 134 connects to an air chamber 130. The air chamber 130 is disposed on the back of the right leg shield 34R.

Figure 13:
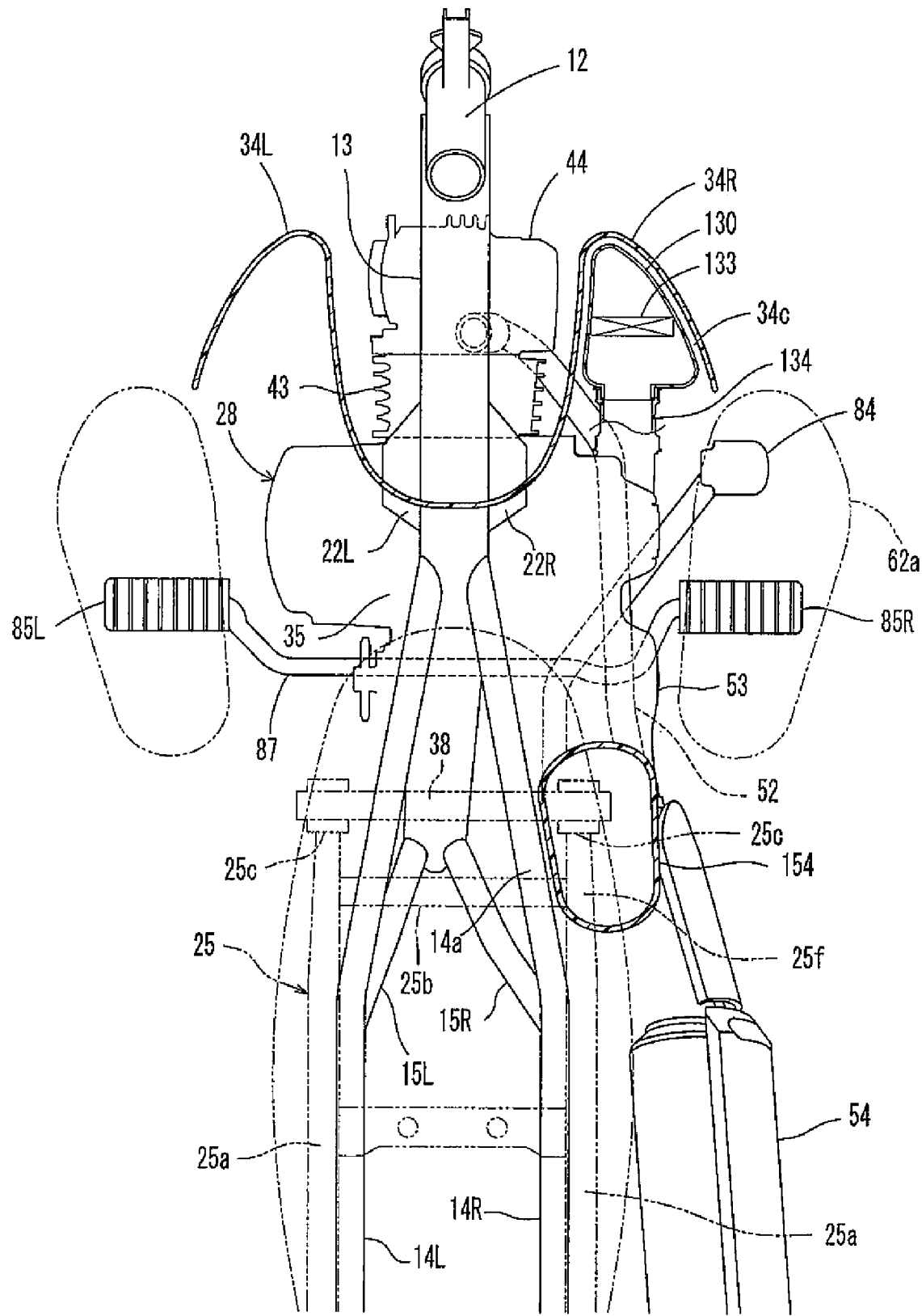
FIG. 13 is a plan view showing the positional relationship among a body frame, an engine unit, an air chamber and so on of the motorcycle according to the second embodiment of the invention.

The air chamber 130 is shaped like a box that is long in one direction, and extends obliquely downward from above across the length of the leg shield 34R. As shown in FIG. 13, the air chamber 130 has a form along the cross section of the leg shield 34R. Specifically, in this embodiment, the leg shield 34R tapers down toward the front, and the air chamber 130 also tapers down. Most of the air chamber 130 is disposed in a space 34c partitioned by the leg shield 34R.

As shown in FIG. 12, an intake duct 131 for taking in air is disposed on the top of the air chamber 130. The intake duct 131 is a bent pipe extending from the top of the air chamber 130 obliquely upward toward the front. The intake port 132 of the intake duct 131 is open obliquely downward toward the front to face the back of the leg shield 34R. However, the orientation of the opening of the intake port 132 is not particularly limited. The air chamber 130 houses a filter 133 (see FIG. 13).

The air chamber 130, the intake duct 131, and the air intake duct 134 are made of resin. However, the material of the air chamber 130, the intake duct 131, and the air intake duct 134 is not limited at all, and they may be made of different materials.

The method for mounting the air chamber 130 is also not limited. For example, as shown in FIG. 12, the air chamber 130 may be secured to brackets 39 mounted to the leg shield 34R with bolts or the like.

As has been described, the air chamber 154 of this embodiment constitutes part of the exhaust passage. The air intake duct 153 of the first embodiment serves as an exhaust duct, the intake duct 156 serves as an exhaust duct, and the intake port 157 serves as an exhaust port. In this embodiment, the air chamber 154 does not contain the filter 155. Since the structures of the exhaust duct 153, the air chamber 154, and the exhaust duct 156 are the same as those of the first embodiment, descriptions thereof are omitted.

Figure 14:
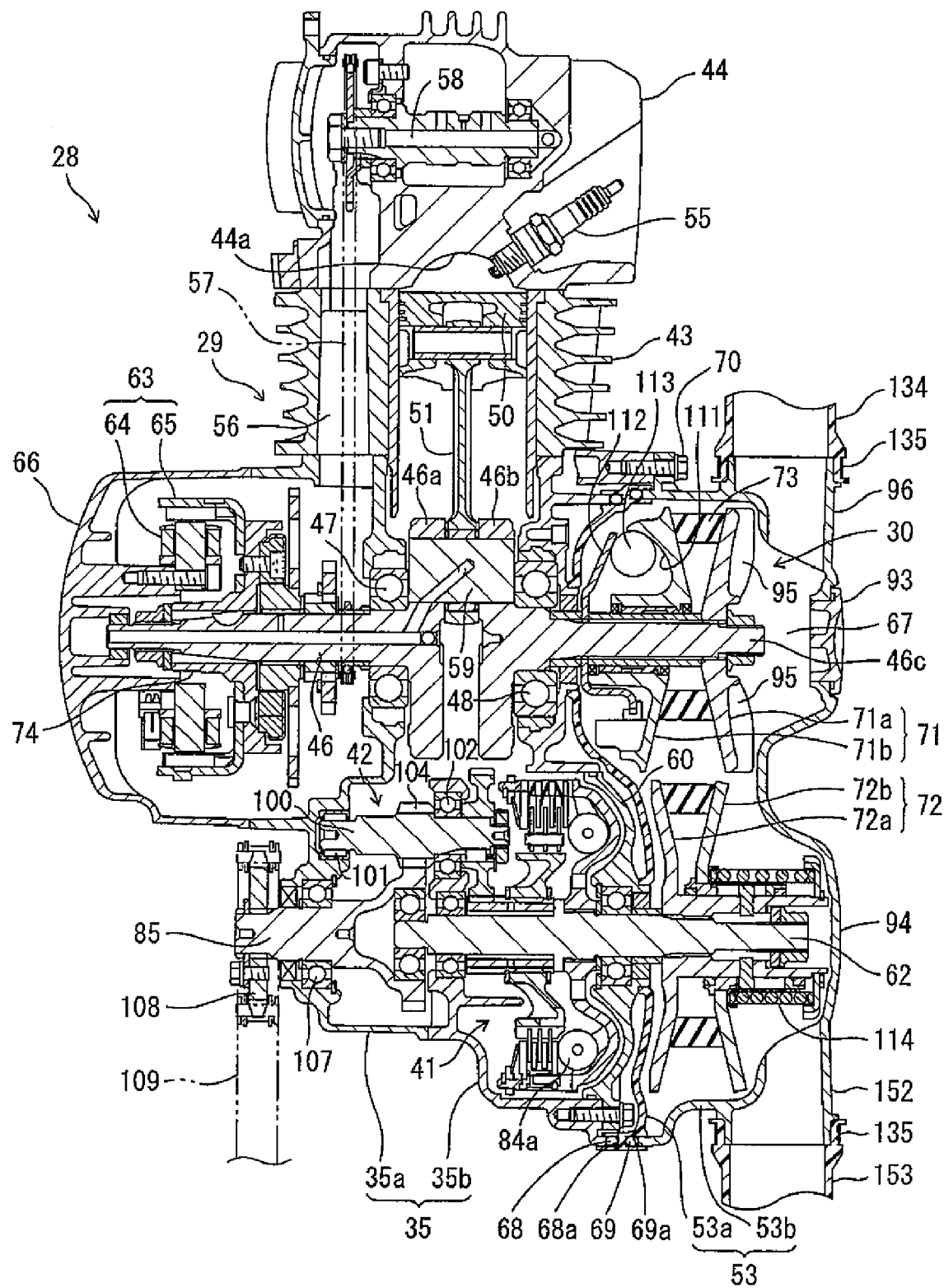
FIG. 14 is a sectional view showing the inner structure of the engine unit of the motorcycle according to the second embodiment of the invention.

Referring to FIG. 14, in this embodiment, the blades 158 (see FIG. 8) are not provided to the secondary sheave 72 of the CVT 30, but fan blades 95 are provided to the primary sheave 71. In other words, the blades 95 for introducing air into the belt chamber 67 are provided outside the fixed sheave half (outer sheave half) 71a of the primary sheave 71. In the embodiment, the inner case 53a is not provided with the vent holes 123, and the second case block 35b is also not provided with the vent holes 124.

In this embodiment, air is drawn through the intake port 132 of the intake duct 131 (see FIG. 12) into the air chamber 130. The air is purified through the filter 133 (see FIG. 13), and is then drawn into the belt chamber 67 through the air intake duct 134 and the connecting pipe 96. The air drawn into the belt chamber 67 cools the primary sheave 71, the secondary sheave 72, and the V-belt 73, and then flows into the air chamber 154 through the connecting pipe 152 and the exhaust duct 153. The air flowing into the air chamber 154 is discharged to the exterior through the exhaust port 157 of the exhaust duct 156. The CVT 30 is thus cooled by the flow of the air.

The embodiment effectively uses the space above the front part 25f of the arm 25a of the rear arm 25 as a space for installing the exhaust passage for discharging the air from the belt chamber 67. Thus, the space for the exhaust passage is provided without increasing the body cover 21 in size. As a result, an exhaust passage having a sufficient flow channel area is provided, enabling both an increase in cooling performance of the CVT 30 and downsizing of the body cover 21.

Although the foregoing embodiment uses the air chamber 154 as part of the exhaust passage, the air chamber 154 is not always necessary. For example, the exhaust duct 153 may extend to the upper rear, and the air chamber 154 and the exhaust duct 156 may be omitted. In other words, part of the exhaust duct 153 that constitutes the exhaust passage may be disposed above the front part 25f of the arm 25a of the rear arm 25. In this case also, the space above the front part 25f of the arm 25a of the rear arm 25 is used effectively as the space for the exhaust passage.

Other Embodiments

Figure 15:
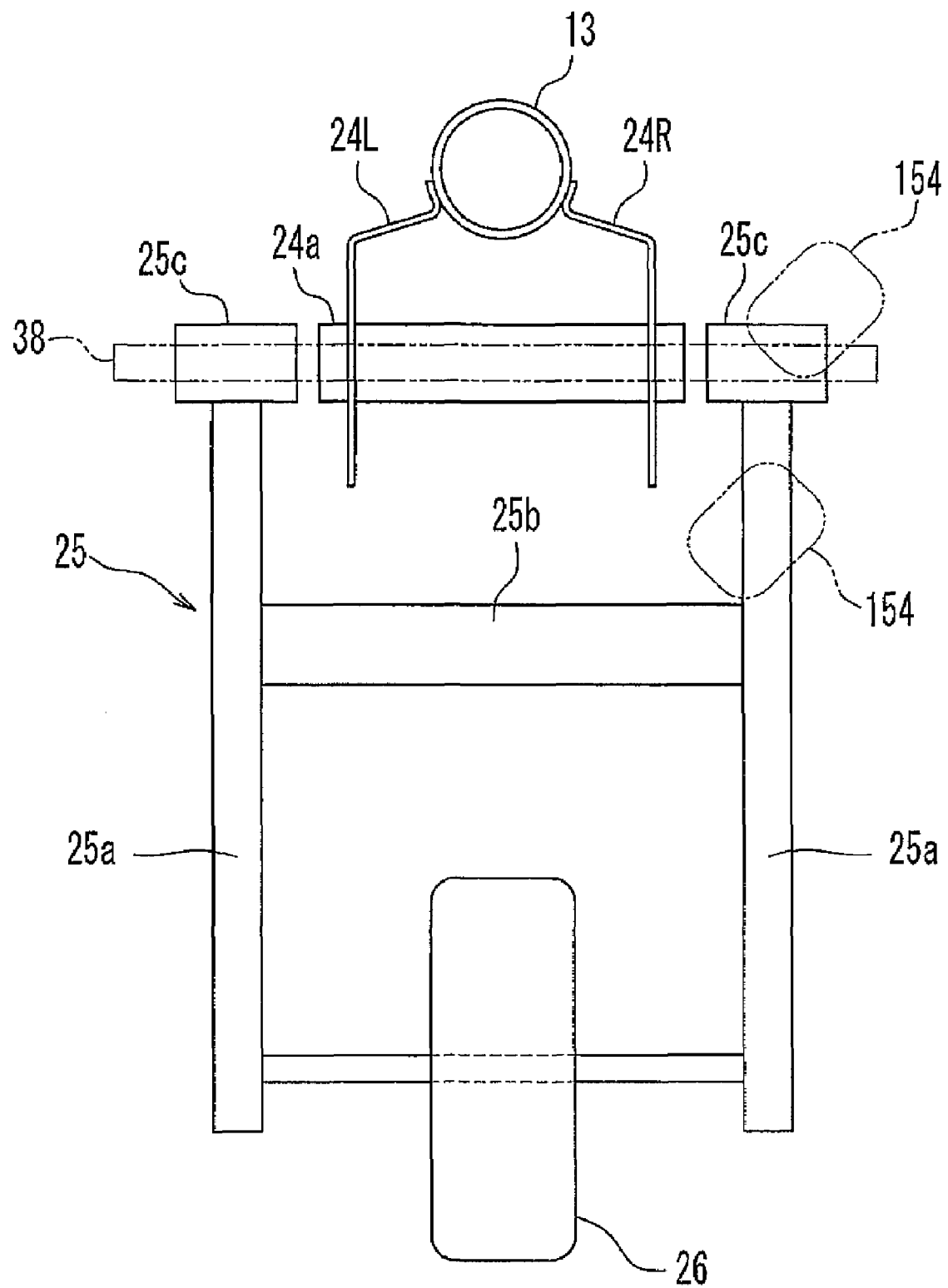
FIG. 15 is a plan view showing the positional relationship between the rear arm and the air chamber.

In the above embodiments, the rear arm 25 includes the pair of right and left arms 25a, and the air chamber 154 is disposed above one of the arms 25a. As schematically shown in FIG. 15, the rear arm 25 includes the pair of right and left arms 25a, the joint 25b that joins the two arms 25a together, and the pair of right and left pivots 25c through which the pivot shaft 38 is passed through. The air chamber 154 is disposed above the front part of one of the arms 25a. Alternatively, the air chamber 154 may be disposed above one of the pivots 25c, as shown in FIG. 15.

Figure 16:
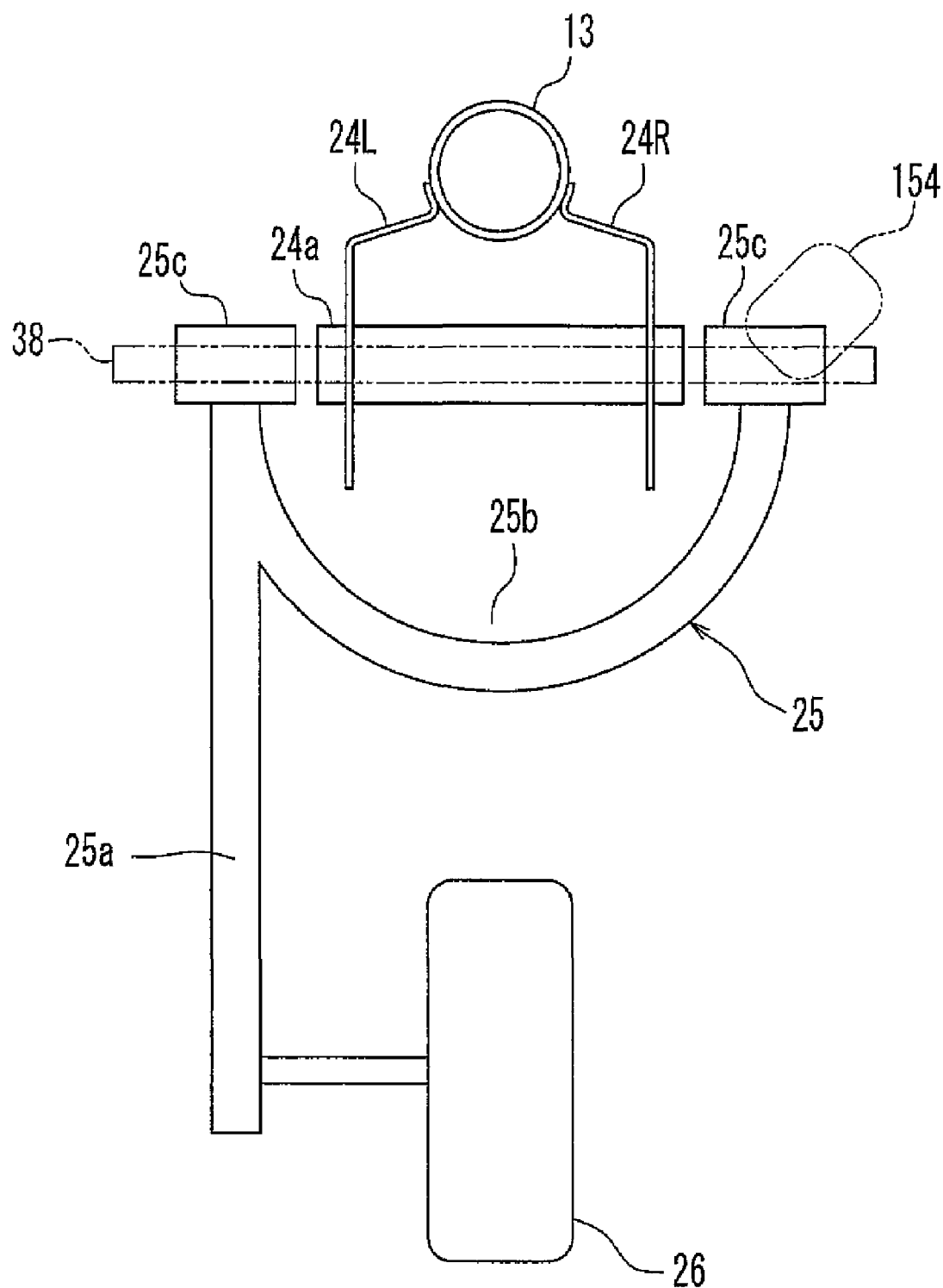
FIG. 16 is a plan view showing the positional relationship between the rear arm and the air chamber in another embodiment of the invention.

The structure of the rear arm 25 is not limited to that of the embodiments. For example, as shown in FIG. 16, the rear arm 25 may include one arm 25a and a pair of right and left pivots 25c. This rear arm 25 may be constructed such that the air chamber 154 is disposed above one of the pivots 25c.

Figure 17:
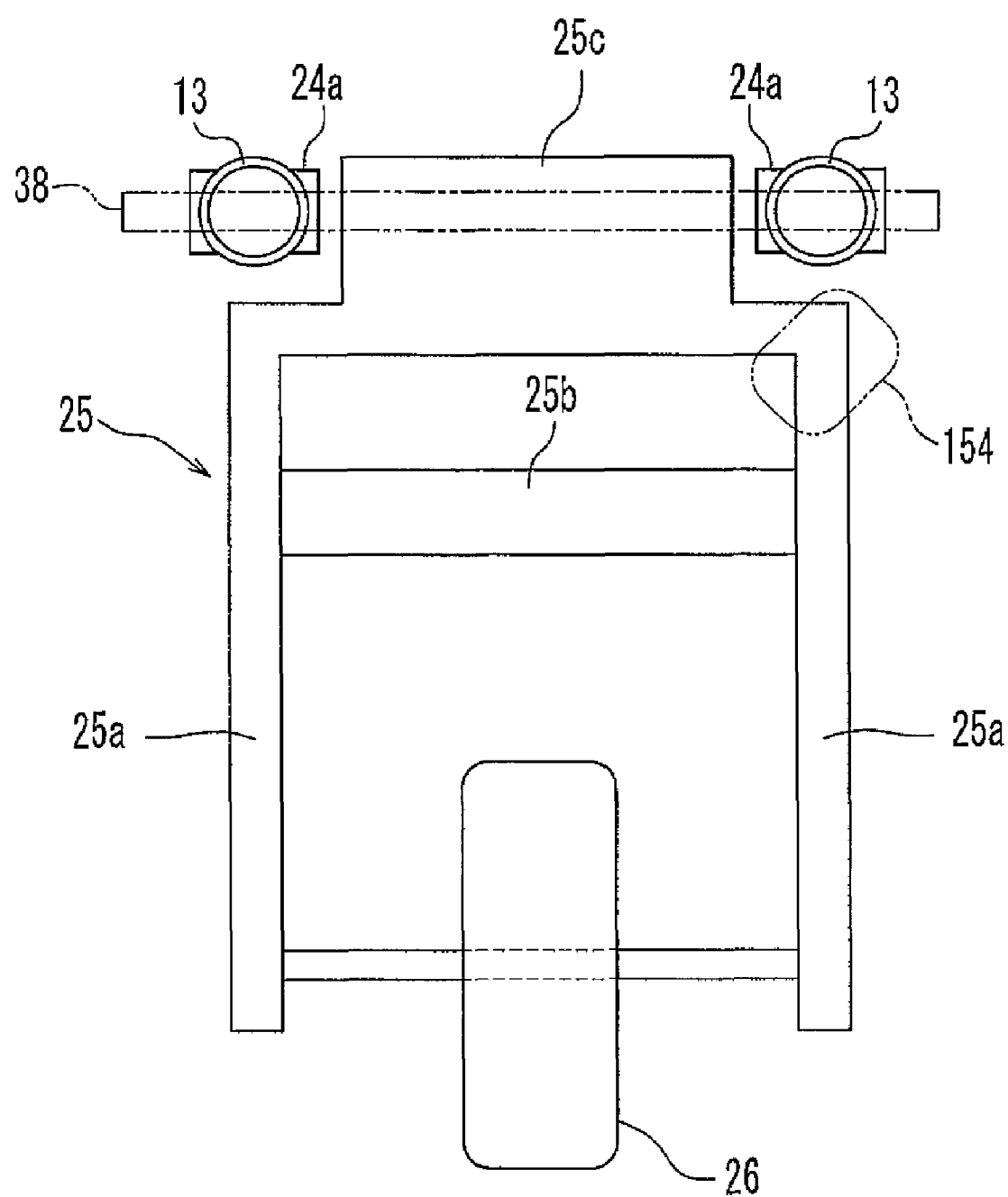
FIG. 17 is a plan view showing the positional relationship between the rear arm and the air chamber in yet another embodiment of the invention.

Alternatively, as shown in FIG. 17, the rear arm 25 may include a pair of right and left arms 25a and one pivot 25c. This rear arm 25 may be constructed such that the air chamber 154 is disposed above the front part of one of the arms 25a.

Figure 18:
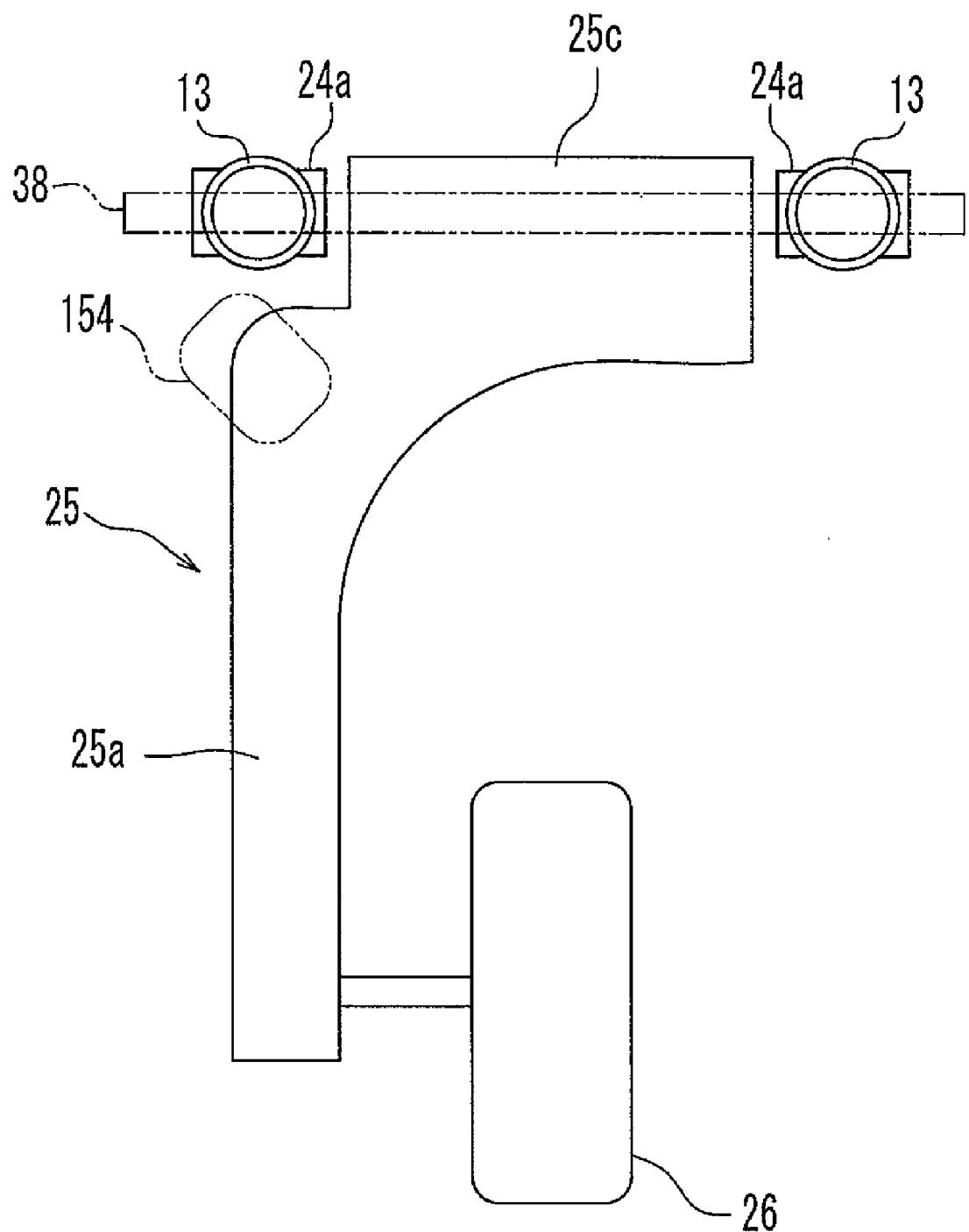
FIG. 18 is a plan view showing the positional relationship between the rear arm and the air chamber in still another embodiment of the invention.

Alternatively, as shown in FIG. 18, the rear arm 25 may include one arm 25a and one pivot 25c. This rear arm 25 may be constructed such that the air chamber 154 is disposed above the front part of the arm 25a.

As has been described above, the invention is useful for a saddle-type vehicle such as a motorcycle.

The particular embodiments of the invention described in this document should be considered illustrative, rather than restrictive. Modification to the described embodiments may be made without departing from the spirit of the invention as defined by the following claims.

The invention claimed is:

1. A saddle-type vehicle comprising:
    a frame;
    an engine unit supported by the frame, and including an engine; a transmission case containing a belt chamber; and a V-belt continuously variable transmission accommodated in the belt chamber;
    a rear arm pivotally supported by the frame behind the transmission case;
    a rear wheel supported by the rear arm; and
    an air passage disposed above a front part of the rear arm relative to a middle thereof in a front-back direction, communicating with the belt chamber.

2. The saddle-type vehicle according to claim 1, further comprising:
    a power transmission mechanism that transmits a driving force of the engine to the rear wheel, wherein
    one of the air passage and the power transmission mechanism is disposed at a right half of the vehicle, while the other is disposed at a left half of the vehicle.

3. The saddle-type vehicle according to claim 1, wherein
    the frame includes a rear-arm bracket that supports the rear arm; and
    the air passage is overlapped with the rear-arm bracket in side view.

4. The saddle-type vehicle according to claim 1, wherein
    the V-belt continuously variable transmission includes: a primary sheave; a secondary sheave located more to the rear than the primary sheave; a primary sheave shaft extending across a vehicle width and rotating the primary sheave; and a secondary sheave shaft extending across the vehicle width and rotating with the secondary sheave;
    an end of the secondary sheave shaft is located crosswise outside an end of the primary sheave shaft; and
    the air passage connects to the secondary sheave of the transmission case.

5. The saddle-type vehicle according to claim 1, further comprising footrest members for supporting a rider's feet outside the transmission case in a vehicle width direction.

6. The saddle-type vehicle according to claim 1, further comprising:
    a pivot shaft that pivotally supports the rear arm; and
    an exhaust gas passage passing below the transmission case and discharging exhaust gas from the engine; wherein
    the exhaust gas passage passes below the pivot shaft in side view.

7. The saddle-type vehicle according to claim 1, wherein the air passage has an air chamber disposed on a side of the frame.

8. The saddle-type vehicle according to claim 1, wherein the air passage has an intake duct.

9. The saddle-type vehicle according to claim 1, further comprising
    a seat for a rider to sit in; wherein
    the air passage is located below the seat.

10. The saddle-type vehicle according to claim 1, further comprising:
    a seat for a rider to sit in; and
    a cover that covers the frame below the seat; wherein
    the air passage is constituted by an intake passage that introduces air into the belt chamber;
    the intake passage having an intake port open to a space in the cover.

11. The saddle-type vehicle according to claim 1, wherein
    the V-belt continuously variable transmission includes: a primary sheave; a secondary sheave located more to the rear than the primary sheave; a primary sheave shaft extending across a vehicle width and rotating the primary sheave; and a secondary sheave shaft extending across the vehicle width and rotating with the secondary sheave;
    the secondary sheave includes an outer sheave half supported by the secondary sheave shaft and rotating with the secondary sheave shaft; and an inner sheave half supported inside the outer sheave half of the secondary sheave shaft in the vehicle width direction, and rotating with the secondary sheave shaft;
    the air passage is constituted by an intake passage connected to the secondary sheave of the transmission case; and
    fan blades are disposed outside the outer sheave half in the vehicle width direction.

12. The saddle-type vehicle according to claim 1, wherein
    the frame has a frame portion extending outward in a vehicle width direction toward the rear;
    the air passage has an air chamber disposed outside the frame portion in the vehicle width direction; and
    the width of the air chamber is narrower at the rear than at the front.

13. The saddle-type vehicle according to claim 1, further comprising:
    seat for a rider to sit in; wherein
    a downward-recessed space is provided in front of the seat;
    a front end of the seat is located more to the front than a front end of the rear arm; and
    a rider in the seat straddles the frame.

14. The saddle-type vehicle according to claim 1, wherein
    the rear arm includes a pair of right and left arms; and
    the air passage is disposed above a front part of one of the two arms relative to a middle thereof in a front-rear direction.

15. The saddle-type vehicle according to claim 1, wherein
    the frame includes a rear-arm bracket that supports the rear arm;

two arms of the rear arm are disposed outside the rear-arm bracket in a vehicle width direction so that the rear-arm bracket is located between the two arms; and the air passage is disposed above one of the two arms and outside the rear-arm bracket in the vehicle width direction.

16. The saddle-type vehicle according to claim 1, wherein the rear arm has a pivot through which a pivot shaft is passed and an arm extending rearward from the pivot; and the air passage is disposed above a forward part of the arm relative to a middle thereof in a front-rear direction.

17. The saddle-type vehicle according to claim 1, wherein the rear arm has a pivot through which a pivot shaft is passed; and the air passage is disposed above the pivot.

* * * * *